(12) United States Patent
Gielow et al.

(10) Patent No.: US 7,962,181 B2
(45) Date of Patent: Jun. 14, 2011

(54) SYSTEM AND METHOD FOR MANAGING APPLICATIONS AND MEDIA CONTENT OF A WIRELESS COMMUNICATION DEVICE

(75) Inventors: Christopher C Gielow, Chicago, IL (US); David S Brenner, Mundelein, IL (US); Stephen R Gay, Chicago, IL (US); Peter J Ina, Arlington Heights, IL (US); Richard J. Schatzberger, Chicago, IL (US)

(73) Assignee: Motorola Mobility, Inc., Libertyville, IL (US)

(*) Notice: Subject to any disclaimer, the term of this patent is extended or adjusted under 35 U.S.C. 154(b) by 0 days.

(21) Appl. No.: 12/489,782

(22) Filed: Jun. 23, 2009

(65) Prior Publication Data
US 2009/0258683 A1 Oct. 15, 2009

Related U.S. Application Data

(62) Division of application No. 10/785,885, filed on Feb. 23, 2004, now abandoned.

(51) Int. Cl.
*H04B 1/38* (2006.01)
(52) U.S. Cl. ........................... 455/566; 455/575.3
(58) Field of Classification Search .............. 455/3.06, 455/575.3, 575.4, 575.1, 566
See application file for complete search history.

(56) References Cited

U.S. PATENT DOCUMENTS

| | | | |
|---|---|---|---|
| 5,740,549 A | 4/1998 | Reilly et al. | |
| 6,084,628 A | 7/2000 | Sawyer | |
| 6,094,681 A | 7/2000 | Shaffer et al. | |
| 6,128,380 A | 10/2000 | Shaffer et al. | |
| 6,138,162 A | 10/2000 | Pistriotto et al. | |
| 6,173,311 B1 | 1/2001 | Hassett et al. | |
| 6,226,684 B1 | 5/2001 | Sung et al. | |
| 6,351,279 B1 | 2/2002 | Sawyer | |
| 6,381,645 B1 | 4/2002 | Sassin | |
| 6,519,241 B1 | 2/2003 | Theimer | |
| 7,483,720 B2 * | 1/2009 | Yajima | 455/566 |
| 2002/0133545 A1 | 9/2002 | Fano et al. | |
| 2003/0065788 A1 | 4/2003 | Salomaki | |
| 2003/0084177 A1 | 5/2003 | Mulligan | |
| 2003/0095540 A1 | 5/2003 | Mulligan et al. | |

(Continued)

FOREIGN PATENT DOCUMENTS
EP 1089566 A 4/2001

(Continued)

OTHER PUBLICATIONS

European Patent Office, "Communication", dated Apr. 21, 2010, pp. 1-6, EPC 10000516.4-2413, Munich, Germany.

(Continued)

*Primary Examiner* — Tu X Nguyen
(74) *Attorney, Agent, or Firm* — Hisashi D. Watanabe

(57) ABSTRACT

A wireless communication device for providing channel information is described. The wireless communication device comprises a housing having a first display and a second display, a memory configured to store a plurality of media objects that may be shown by the second display, and a processor coupled to the second display. The housing has a first position exposing the first and second displays and a second position covering the first display and exposing the second display. The processor is configured to change operation of the second display from one media object to another.

6 Claims, 17 Drawing Sheets

U.S. PATENT DOCUMENTS

| | | |
|---|---|---|
| 2003/0101246 A1 | 5/2003 | Lahti |
| 2003/0149734 A1 | 8/2003 | Aaltonen et al. |
| 2004/0067769 A1* | 4/2004 | King et al. .................. 455/556.1 |
| 2004/0088656 A1 | 5/2004 | Washio |

FOREIGN PATENT DOCUMENTS

| | | |
|---|---|---|
| EP | 1262214 | 12/2002 |
| WO | 9741690 A | 11/1997 |
| WO | 0075812 A1 | 12/2000 |
| WO | 0213176 A | 2/2002 |
| WO | 0244892 A2 | 6/2002 |

OTHER PUBLICATIONS

XP002339919; URL: www.gege.org/portables; Dec. 4, 2003.

Patent Abstracts of Japan; Japanese Publication No. 2002057878 to Taku, Sugioka; published Feb. 22, 2002.

Patent Abstracts of Japan; Japanese Publication No. 2002335369 to Kaoru, Sakaida; published Nov. 22, 2002.

United States Patent and Trademark Office, "Office Action Summary", Oct. 18, 2010, pp. 1-16, U.S. Appl. No. 12/489,593, Alexandria, Virginia.

* cited by examiner

SYSTEM AND METHOD FOR MANAGING APPLICATIONS AND MEDIA CONTENT OF A WIRELESS COMMUNICATION DEVICE

RELATED APPLICATIONS

This is a divisional of U.S. application Ser. No. 10/785,885, filed Feb. 23, 2004.

FIELD OF THE INVENTION

The present invention relates generally to the field of systems and methods for providing information to wireless communication devices. More particularly, the present invention relates to systems and methods for providing applications and media artifacts, including text, video, audio and multimedia content, to wireless communication devices that utilize and interact with such content.

BACKGROUND OF THE INVENTION

Advancements in computing networks have facilitated distribution of information to users of computing devices. Each computing device of a computing network may request access to information stored by other devices coupled to the network. A computing device coupled to a large network, such as the Internet, may have access to a similarly large amount of information.

One advancement in computing networks is the development of Push Technology. Unlike other systems which require each device to request information from information sources, Push Technology delivers information automatically to a device according to programmed preferences. Thus, Push Technology eliminates the need of a computing device to seek out one or more information sources to gather specific information of interest. Many companies utilize Push Technology to "push" software updates directly to various computing devices operated or otherwise owned by them.

Although Push Technology is often used for wired computing devices, it is less often used for providing information to wireless communication devices. Users of wireless communication devices frequently need access to a variety of information, but such information is not as readily available to as wired connections due to the limited bandwidth of wireless connections. Wireless communication systems are challenged to maximize the quality of information provided to wireless communication devices while minimizing the traffic imposed on the wireless connections to the devices.

It is further challenge for wireless communication devices to provide received information on second displays. A second display on a conventional wireless communication device typically provides caller-line identification information as well as status information about the device. The second display is typically secondary or supplemental to a primary display of the device and, thus, is smaller than the primary display. Unfortunately, due to the limited dimensions of a second display, manufacturers and suppliers of wireless communication devices are challenged to find a way to maximize the quality of information provided by the second display.

In view of the above, there is a need for a system and method for managing and displaying content on a second display of a wireless communication device to maximize content quality. Also, there is a need for a system and method to maximize content quality on the second display while minimizing burdens on network traffic.

DETAILED DESCRIPTION OF THE PREFERRED EMBODIMENTS

One aspect of the present invention is a wireless communication device for providing channel information comprising a housing having a first display and a second display. The housing has a first position exposing the first and second displays and a second position covering the first display and exposing the second display. The device further comprises a memory and a processor coupled to the second display. The memory is configured to store a plurality of applications and/or media content that may be shown by the second display. The processor is configured to change operation of the second display from one application to another and/or the media content shown by the second display from one media content to another.

Another aspect of the present invention is a wireless communication device comprising one display configured to change from one application to another, and wherein another display configured to operate one or more configuration settings that control operation of the other display.

Figure 1:
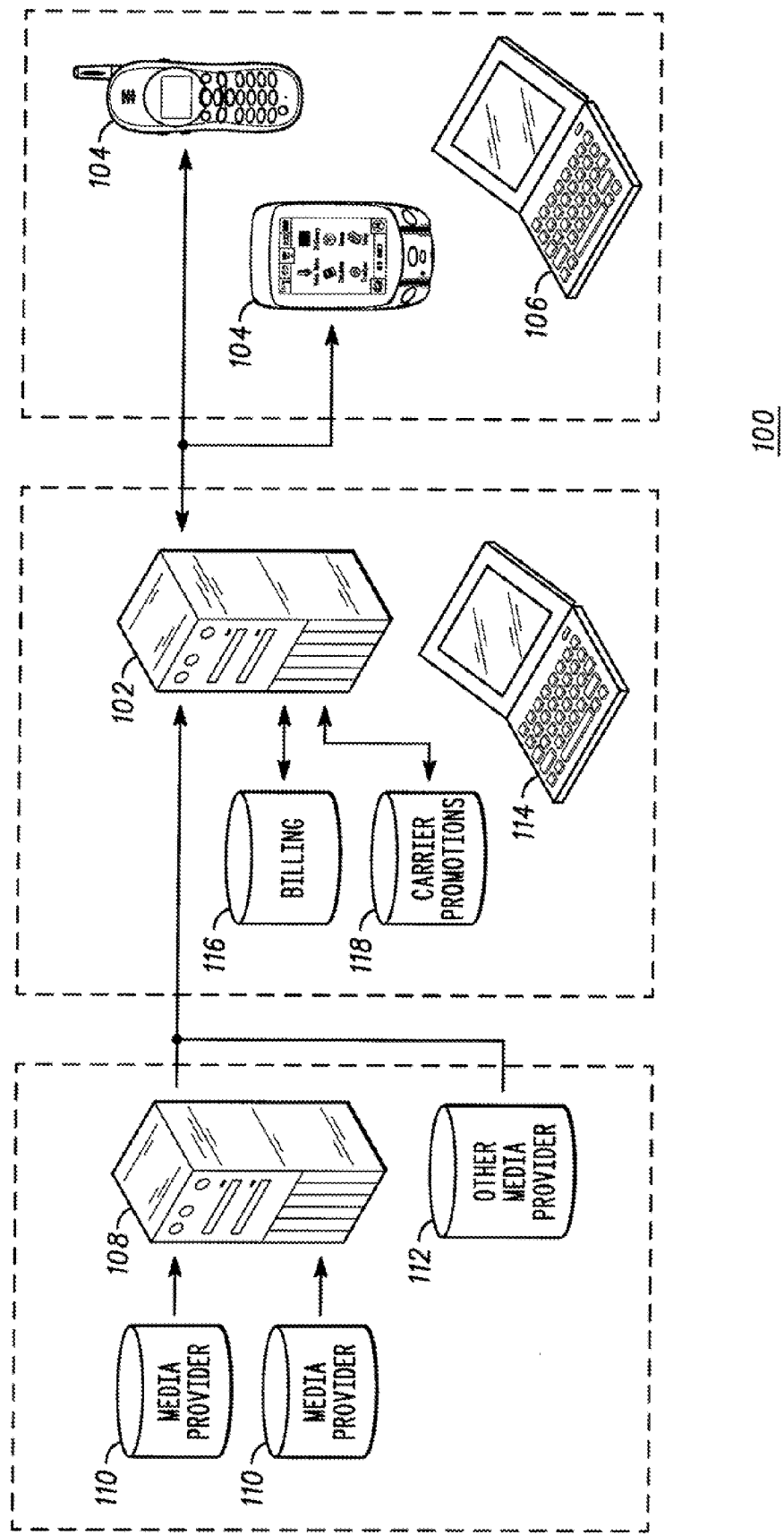
FIG. 1 is a schematic diagram illustrating an exemplary embodiment in accordance with the present invention.

Referring to FIG. 1, there is provided a wireless communication system 100 in accordance with the present invention. The system 100 includes one or more media gateway 102 communicating via wireless link to a plurality of wireless communication devices 104. Any type of wireless link may be utilized for the present invention, but it is to be understood that a high speed wireless data connection is preferred. For example, each media gateway 102 may communicate with the plurality of wireless communication devices 104 via a cellular-based communication infrastructure that utilizes a cellular-based communication protocols such as AMPS, CDMA, TDMA, GSM, iDEN, GPRS, EDGE, UMTS, WCDMA and their variants. Each media gateway 102 may also communicate with the plurality of wireless communication devices 104 via a peer-to-peer or ad hoc system utilizing appropriate communication protocols such as Bluetooth and IEEE 802.11. A wireless communication device 106 may also communicate with the media gateway 102 indirectly via another wireless communication device 104 that is communicating with the media gateway directly. In such case, the indirect wireless communication device 106 may communicate with the direct wireless communication device 104 via a wireless link as described above or a direct link, such as a cable or connector. It is to be understood that any functionality of the wireless communication device 104 may also apply to the indirect wireless communication device 106 due to the communication between the devices via the above wireless link.

The media gateway 102 may receive feeds of media channels, buffer and cache the feeds, and feed them to wireless communication devices 104. The term "channel" refers to content that is received from a single content source and provided in a particular format, such as an XML language, and the term "feed" refers to fetching of a file from a particular channel. For one embodiment, the media gateway 102 compresses combined channels and provides them to the wireless communication devices 104 where they are decompressed, separated and stored in a content cache. The media gateway 102 may feed information to the wireless communication device 104 using push, pull and poll technology. For example, for one embodiment, the media gateway 102 generally pushes information to the wireless communication device 104, and the device pull technology from the media gateway upon request.

Although the media gateway 102 may operate on a common platform with other devices, the media gateway may also serve as a control point across multiple platforms. Regardless of the platform used, the media gateway 102 controls, bills and tracks information that is available to the wireless communication devices 104 and, thus, has access to media content from one or more sources. As shown in FIG. 1, the media gateway 102 may receive media content from a content aggregator 108 that collects media content from various media providers 110 and/or from media providers 112 directly. Preferably, all media content received by the media gateway are provided in a common format such as, for example, the XML language using the RDF Site Summary (RSS) specification. Some media providers 110 may not provide media content in a common format, so they may deliver the media content to the content aggregator 108. The content aggregator 108 may, in turn, convert the media content to a common format and forward the converted media content to the media gateway 102.

The media gateway 102 may also be directly controlled by a service provider, or be coupled to a cockpit controller 114 of a service provider, to manage the flow of billing information 116 and/or other media content 118, such as service provider promotions, for the wireless communication system 100.

Figure 2:
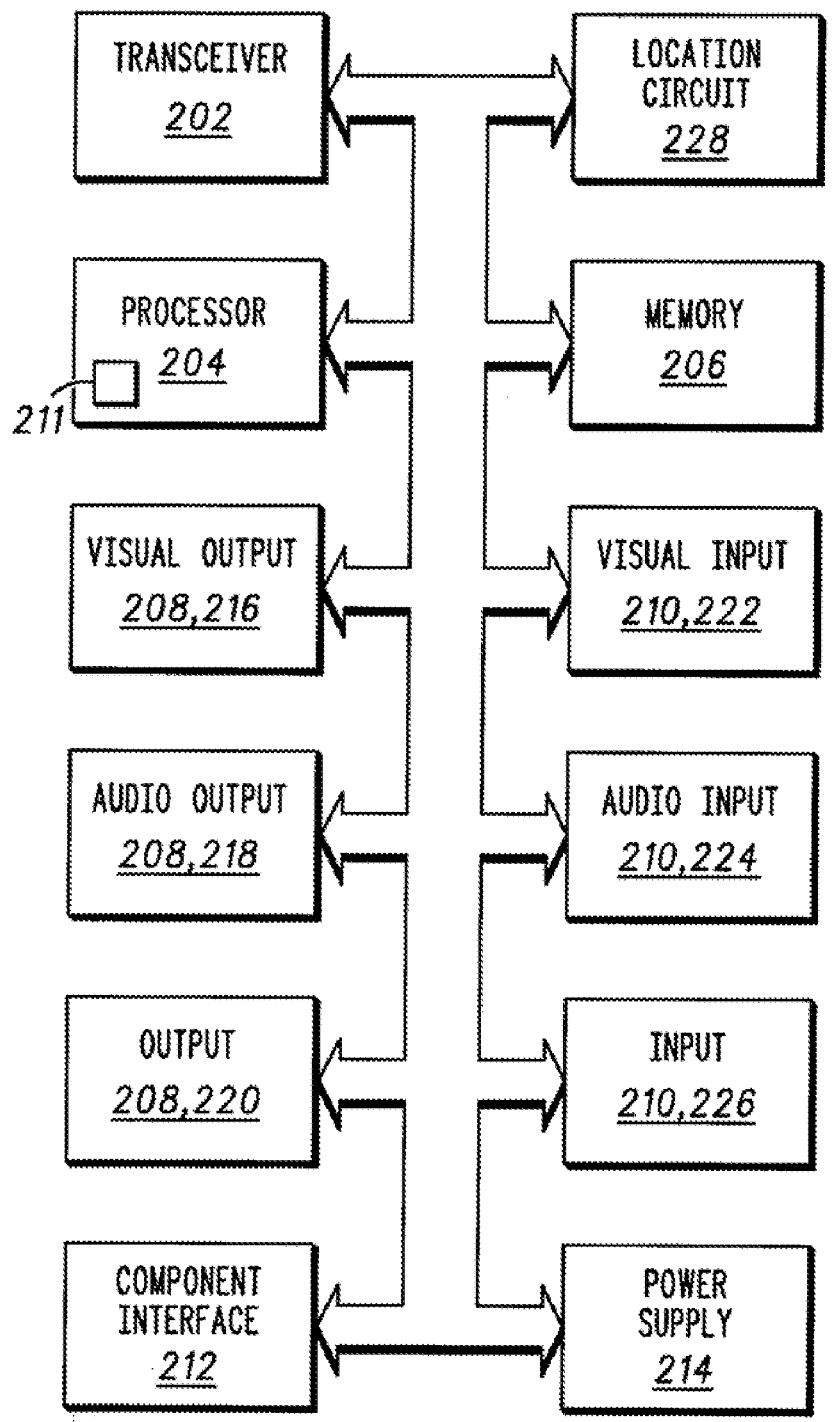
FIG. 2 is a block diagram illustrating exemplary internal components of various servers, controllers and devices that may utilize the present invention.

Referring to FIG. 2, there is provided a block diagram illustrating exemplary internal components of various servers, controllers and devices that may utilize the present invention. The exemplary embodiment includes one or more transceivers 202, a processor 204, a memory portion 206, one or more output devices 208, and one or more input devices 210. Each embodiment may include a user interface that comprises at least one input device 210 and may include one or more output devices 208. Each transceiver 202 may be a wired transceiver, such as an Ethernet connection, or a wireless connection such as an RF transceiver. The processor 204 may couple to, i.e., may include or be connected to, a timing circuit 211 that may determine the current time, i.e., current date and time of day, of the device. Unless otherwise stated, the term "time" as used herein may also include calendar date information as well as clock time information. The internal components 200 may further include a component interface 212 to provide a direct connection to auxiliary components or accessories for additional or enhanced functionality. The internal components 200 preferably include a power supply 214, such as a battery, for providing power to the other internal components while enabling the server, controller and/or device to be portable.

Referring to the media gateway 102, wireless communication devices 104 and content aggregator 108 shown in FIG. 1, each machine may have a different set of internal components. The media gateway 102 and the content aggregator 108 may include a transceiver 202, a processor 204, a memory 206 and a power supply 214 but may optionally include the other internal components 200 shown in FIG. 2. The memory 206 of the media gateway 102 and the content aggregator 108 should include high capacity storage in order to handle large volumes of media content. Each wireless communication device 104 must include a transceiver 202, a processor 204, a memory 206, one or more output devices 208, one or more input devices 210 and a power supply 214. Due to the mobile nature of the wireless communication device 104, the transceiver 202 should be wireless and the power supply should be portable, such as a battery. The component interface 212 is an optional component of the wireless communication device 104.

An exemplary function of the wireless communication device 104 as represented by the internal components 200, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for one or more output devices 208. Likewise, for transmission of wireless signals, the processor 204 formats outgoing information, which may or may not be activated by the input devices 210, and conveys the outgoing information to the transceiver 202 for modulation to communication signals. The transceiver 202 conveys the modulated signals to the media gateway 102 via a remote transceiver.

The input and output devices 208, 210 of the internal components 200 may include a variety of visual, audio and/or mechanical outputs. For example, the output device(s) 208 may include a visual output device 216 such as a liquid crystal display and light emitting diode indicator, an audio output device 218 such as a speaker, alarm and/or buzzer, and/or a mechanical output device 220 such as a vibrating mechanism. Likewise, by example, the input devices 210 may include a visual input device 222 such as an optical sensor (for example, a camera), an audio input device 224 such as a microphone, and a mechanical input device 226 such as a flip sensor, keyboard, keypad, selection button, touch pad, touch screen, capacitive sensor, motion sensor, and switch. Actions that may actuate one or more input devices 210 include, but not limited to, opening the wireless communication device, unlocking the device, moving the device to actuate a motion, moving the device to actuate a location positioning system, and operating the device.

The internal components 200 of the media gateway 102, wireless communication devices 104 and content aggregator 108 may include a location circuit 228. Examples of the location circuit 228 include, but are not limited to, a Global Positioning System (GPS) receiver, a triangulation receiver, an accelerometer, a gyroscope, or any other information collecting device that may identify a current location of the device.

The memory portion 206 of the internal components 200 may be used by the processor 204 to store and retrieve data. The data that may be stored by the memory portion 206 include, but is not limited to, operating systems, applications, and data. Each operating system includes executable code that controls basic functions of the communication device, such as interaction among the components of the internal components 200, communication with external devices via the transceiver 202 and/or the component interface 212, and storage and retrieval of applications and data to and from the memory portion 206. Each application includes executable code utilizes an operating system to provide more specific functionality for the communication device, such as file system service and handling of protected and unprotected data stored in the memory portion 206. Data is non-executable code or information that may be referenced and/or manipulated by an operating system or application for performing functions of the communication device.

The processor 204 may perform various operations to store, manipulate and retrieve information in the memory portion 206. Each component of the internal components 200 is not limited to a single component but represents functions that may be performed by a single component or multiple cooperative components, such as a central processing unit operating in conjunction with a digital signal processor and one or more input/output processors. Likewise, two or more components of the internal components 200 may be combined or integrated so long as the functions of these components may be performed by the communication device.

Figure 3:
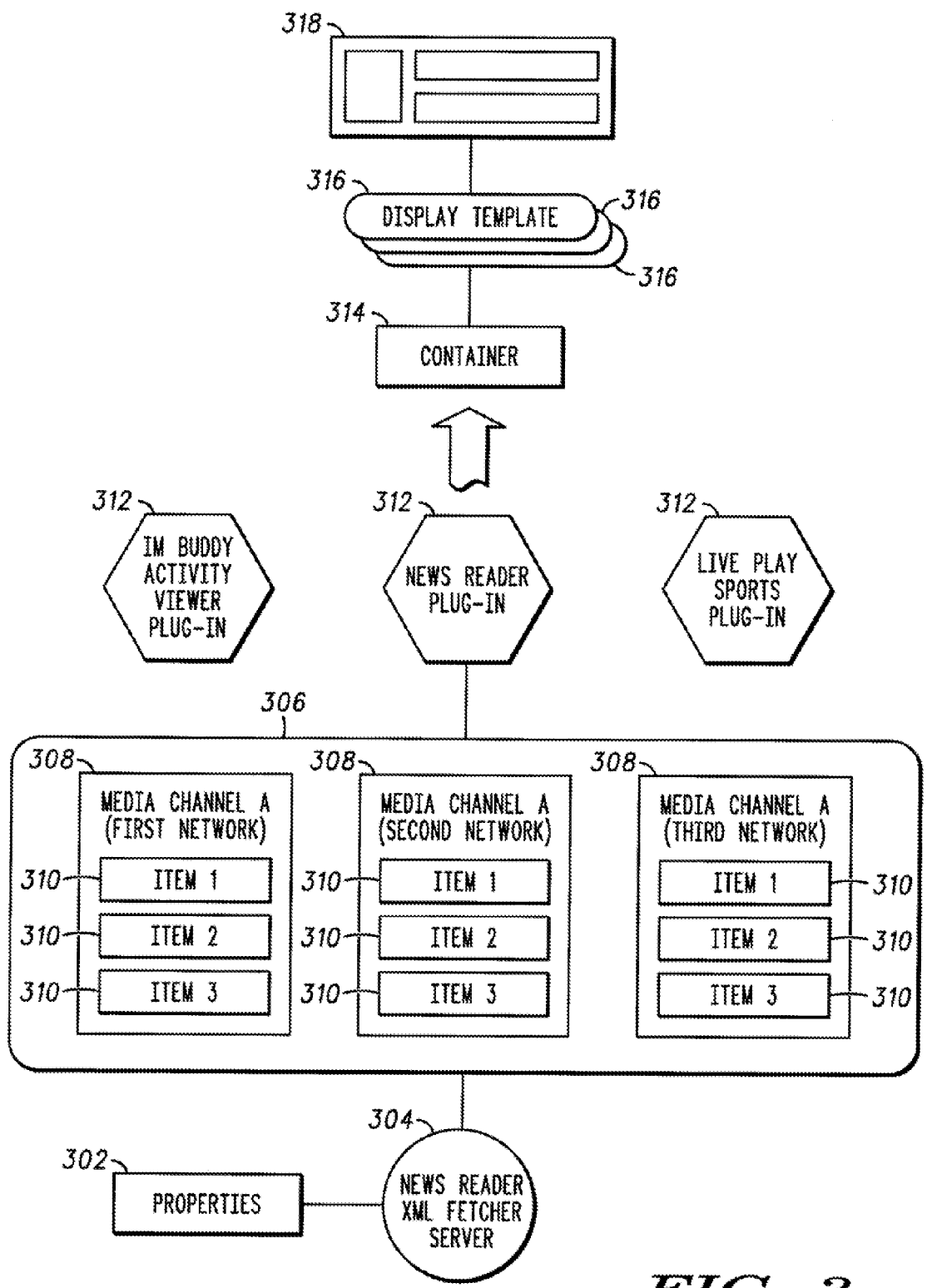
FIG. 3 is a schematic diagram illustrating an exemplary embodiment of a device in accordance with the present invention.

Referring to FIG. 3, there is provided a schematic diagram illustrating an exemplary embodiment of a device, such as wireless communication device 104. As described above, channels of content and properties 302, such as connection and channel settings, are received from one or more media gateways 102 by each wireless communication device 104. Channels are chosen from a list, synchronized on the media gateway 102, identifying channels that are available to the wireless communication device 104. The wireless communication device 104 includes a service 304, stored in the memory 206 and executed by the processor 204, that fetches content from the media gateway 102 and places them a content cache 306 of the memory. The content files and fetch details are specified by the channel settings and properties received from the media gateway 102. Each content file includes one or more items having information based on a common format, such as an XML schema based off RSS. For example, as shown in FIG. 3, the content cache 306 may store multiple channels 308 of content in which each channel may include multiple items 310 of content.

The exemplary embodiment of the device also includes one or more plug-ins 312 to provide functionality and one or more containers 314 operating as framework elements and having an area on the display. Examples of plug-in functionality include, but are not limited to, instant messaging buddy activity viewing, news reading and live play sport viewing. Each container 314 may be associated with one or more plug-ins 312. For example, as shown in FIG. 3, the news reader plug-in 312 is loaded into the container 314. For one embodiment, the plug-in 312 is designed to fetch XML (RSS) files and display the content referenced in the XML file for the container 314. The container 314 holds rules for interaction between loaded plug-ins based on where the container is displayed, e.g., idle status of the device.

The exemplary embodiment of the device further includes one or more display templates 316 and a display area 318, as referenced above, associated with a container 314. Each container 314 may provide a channel 308 of content, stored in the content cache 306, at the display area 318 of an output device 208. Individual items 310 of the channel 308 are displayed based on the container information and corresponding display template 316. The display template 316 defines the manner in which content is displayed at the display area 318. The display template 316 to use for a particular content is defined by channel settings for the current channel 308.

FIGS. 4 through 9 represent examples of important functions of the dynamic portal system and method in accordance with the present invention, in particular, examples of an activation operation, a change request operation, a manual refresh operation, a new contents notification operation, a display contents operation, and a channel subscription and un-subscription operation. These functions are performed by various components of the dynamic portal system, namely a Graphical User Interface (GUI) 402, a Dynamic Idle Service 404, a Service Loader 502, a Cache Manager 406, a Fetch Task 408, and a Media Gateway (Media GW) 410. The GUI 402 is an application of the wireless communication device 104 that interacts with a user, i.e., provides information via the output devices 208 and receives information via the input devices 210. The Dynamic Idle Service 404 is another application of the wireless communication device 104 that manages the containers 313 and their associated media content and applications (e.g., plug-ins). The Service Loader is another application of the wireless communication device 104 that manages the services to be received by the wireless communication device 104, namely identifying the channels of media content to be provided to the user. The Cache Manager 406 is yet another application of the wireless communication device 104 that manages the content cache 306 of channels 308. The Fetch Task 408 is still another application of the wireless communication device 104 that manages and stores formatted feeds, such as XML (RSS) feeds, received from the media gateway 102. The Media GW 410 represents the media gateway 102 shown in FIG. 1.

The dynamic portal system and method may operate during an idle mode of the wireless communication device 104. The wireless communication device 104 is generally designed to perform operations directed by its user. When the user interacts with the input devices 210 of the wireless communication device 104, the device responsively performs the requested functions as it is able, such as managing voice calls, text messages, and the like. When the wireless communication device 104 no longer performs such functions and is merely waiting to activity, the device enters the idle mode. When the device 104 enters the idle mode, the dynamic portal system and method may operate in response.

Figure 4:
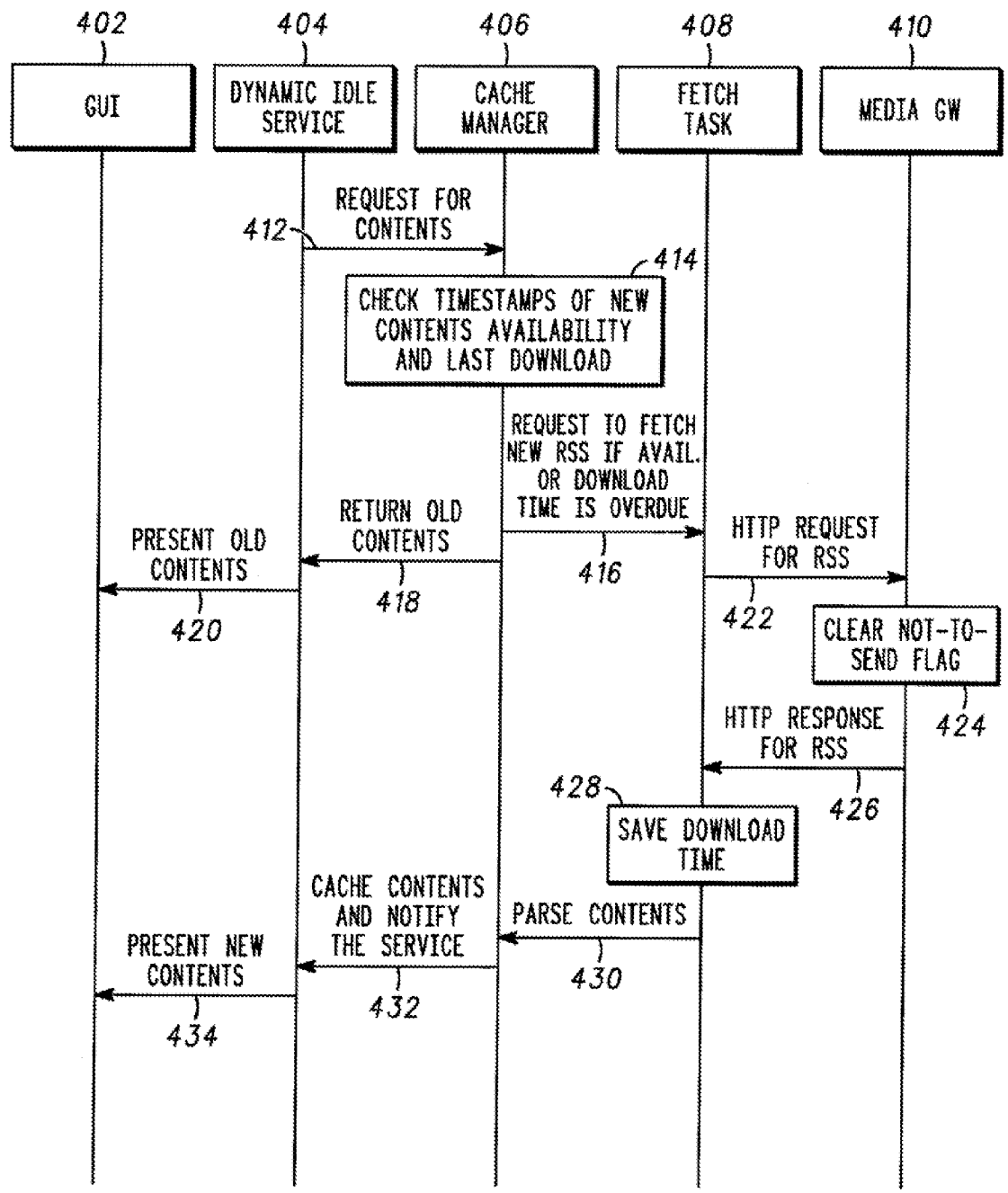
FIG. 4 is a flow diagram illustrating an exemplary activation operation of the device in accordance with the present invention.

FIG. 4 is a flow diagram illustrating an exemplary activation operation 400 of the wireless communication device 104. When a user initially activates the device 104, the device may start in the idle mode and have one or more default containers configured. The number of containers, the container types, channels and contents are pre-configured in the device 104 and defined in a Dynamic Portal configuration file and its container profiles. The wireless communication device 104 may then execute its normal start-up sequences, create personal settings and load up the default contents for viewing by the user. The default contents may come from a local storage, such as the content cache 306 of the memory 206.

After a network connection is established, the new contents may be downloaded from a service provider's media gateway 102. Initially, the Dynamic Idle Service 404 sends a request for contents to the Cache Manager 406 at step 412. The Cache Manager 406 then checks the timestamps of the media content in the content cache 306 for new contents availability and last download time at step 414. If new media content is available or the existing media content (presently stored in the content cache 306) is not up-to-date, then the Cache Manager 406 sends a request to fetch new media content to the Fetch Task 408 at step 416. The Cache Manager 406 also provides the existing media content to the Dynamic Idle Service 404 at step 418 which, in turn, forward the existing media content to the GUI 402 for viewing by the user at step 420.

In response to receiving the request to fetch new media content from the Cache Manager 406, the Fetch Task 408 sends a formatted request for the new media content, in an appropriate common format, to the Media GW 410 at step 422. For example, for one embodiment, the Fetch Task 408 sends an HTTP request for RSS content. The Media GW 410 then clears a Not-to-Send flag at step 424 and sends a formatted response, including the requested content in the requested format, to the Fetch Task 408 at step 426. After receiving the response, the Fetch Task 408 saves the time of download and associates it with the received media content at step 428. The Fetch Task 408 also parses the received media content, for example, into appropriate channels. The Fetch Task 408 then sends the media content to the Cache Manager 406 for storage in the content cache 306 at step 430. Thereafter, the Cache Manager 406 sends the media content and a service notification to the Dynamic Idle Service 404 at step 432 and, in turn, the Dynamic Idle service forwards the media content to the GUI 402 for presentation to the user at step 434.

The initial contents may be provided free by the GUI 402 for a specific length of time, i.e., trial period. Once the trial period is over, if the user does not subscribe any channels, the service provider may provide some free media content (e.g., out of date content) to fill up the channels and only subscribed channels would have up-to-date media content. Also, media content may be received from a Media GW 410 of a particular service provider may be tied to an identity card of the wireless communication device 104, such as a SIM card. When a different SIM is inserted to the device 104, the cached and archived contents may be removed during the startup sequence of the device.

The media content is periodically pulled or pushed from the service provider's Media GW 410. The latest and non-duplicated news may be downloaded to the wireless communication device 104. A service provider may define the polling interval and the number of news articles to be downloaded at a given time. The user of the wireless communication device 104 may adjust the scrolling rate for viewing media content, set the storage size for the archived media content, when the archived media content will be deleted, and other options to be configured by the user.

Figure 5:
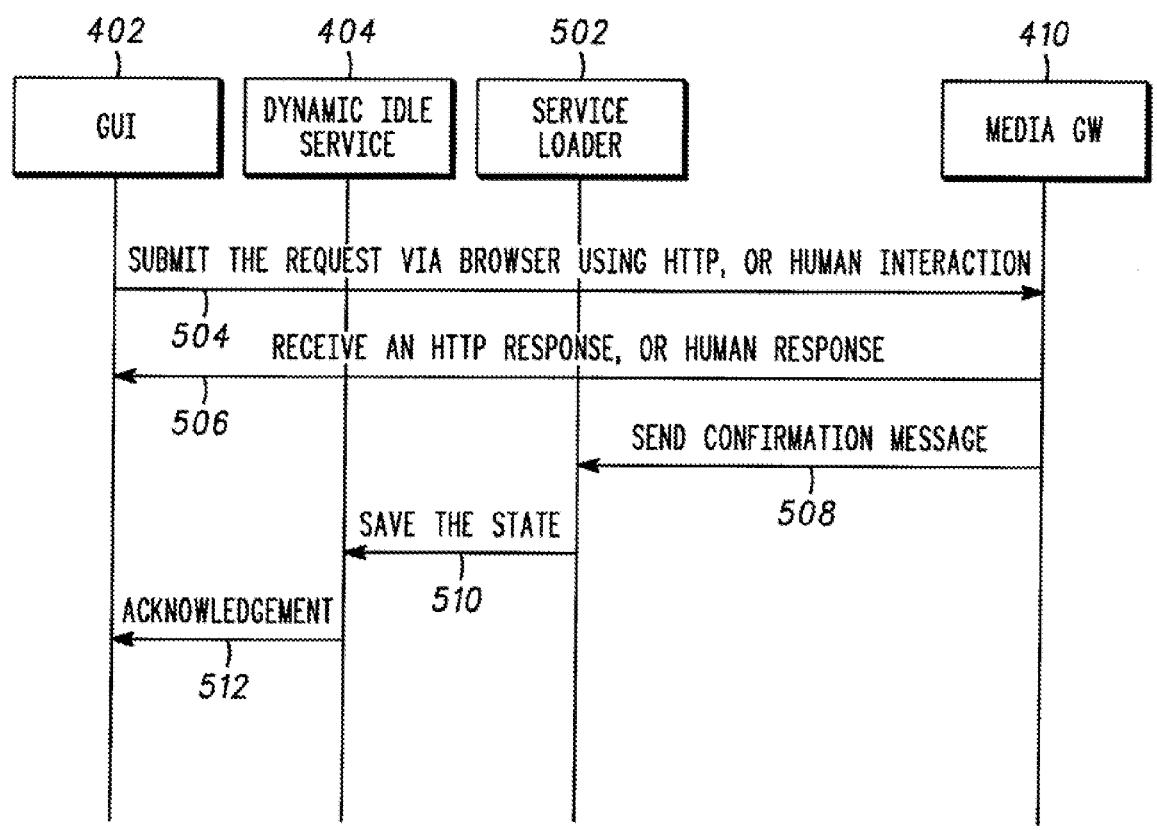
FIG. 5 is a flow diagram illustrating an exemplary change request operation of the device in accordance with the present invention.

FIG. 5 is a flow diagram illustrating an exemplary change a request of "No Download When Roaming" operation 500 of the wireless communication device 104. A user of the wireless communication device 104 or a service provider may wish to avoid any downloading of media content to the communication device when the device is roaming. If the device 104 is or will be roaming, then the Media GW 410 should avoid downloading any media content; if the device 104 is not or will not be roaming, then the Media GW should permit downloading of media content. By preventing downloads during roaming, the processing capacity and power source level of the wireless communication device 104 may be preserved. For this operation 500, the GUI 402 submits the request to the Media GW 410 at step 504. The request may be provided by messaging, such as via a browser using HTTP, or by human interaction, such as via voice. In response to the request, the Media GW 410 sends a response message back to the GUI 402 at step 506. Then, when the Media GW 410 is able to confirm that the request is granted, it sends a confirmation message to the Server Loader 502 at step 508. After receiving the confirmation message, the Server Loader 502 instructions the Dynamic Idle Service 404 to save the state, i.e., prevent download or permit download, of the request at step 510. Thereafter, the Dynamic Idle Service 404 sends an acknowledgement 512 to the GUI 402 at step 512.

Figure 6:
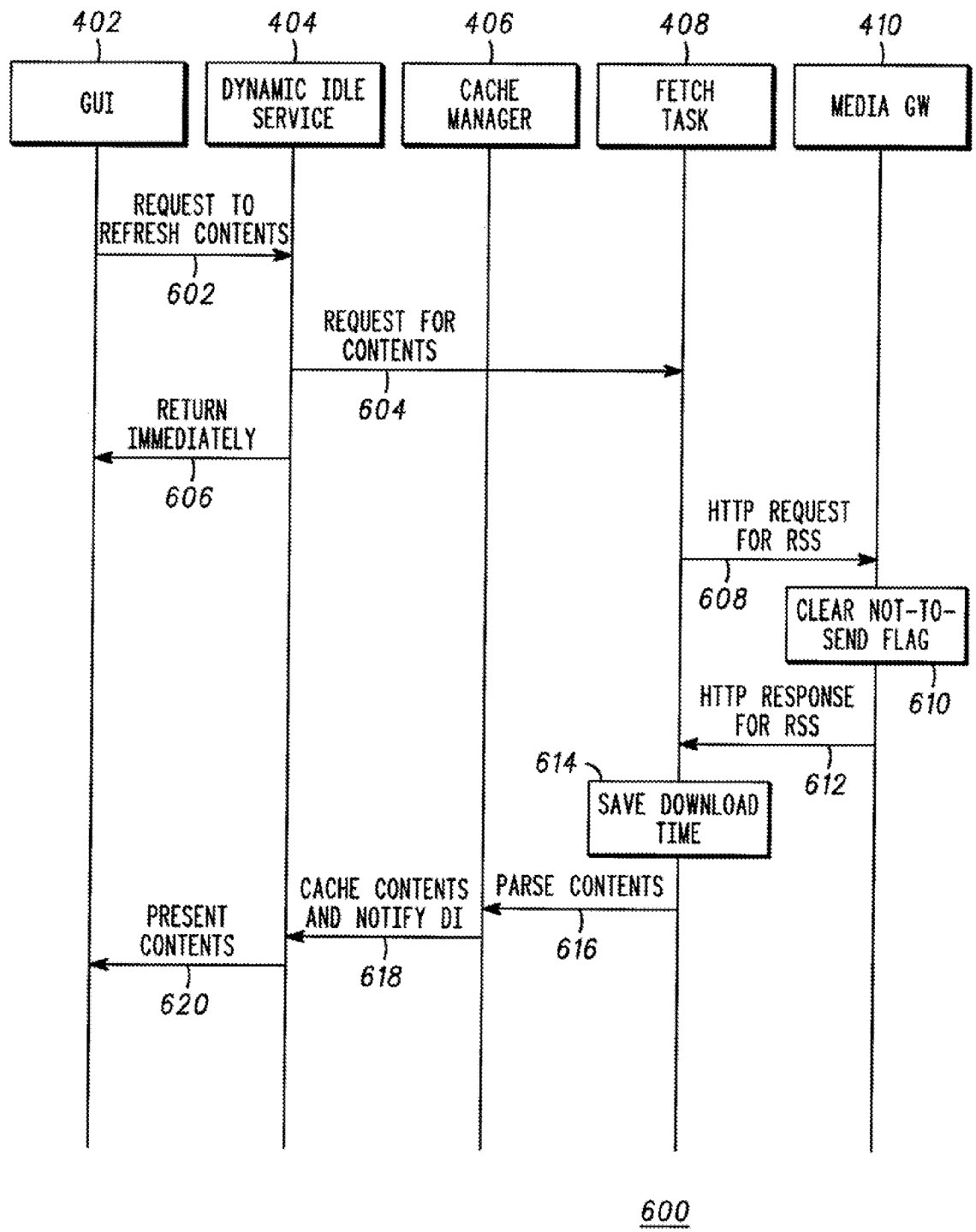
FIG. 6 is a flow diagram illustrating an exemplary manual refresh operation of the device in accordance with the present invention.

FIG. 6 is a flow diagram illustrating an exemplary manual refresh operation 600 for an asynchronous model of the wireless communication device 104. Although media gateway 102 will generally push media content to the wireless communication device 104, there may be one or more occasions when the device will need to pull media content from the media gateway, such as a refresh request. For this operation 600, the GUI 402 sends a request to refresh contents to the Dynamic Idle Service 404 at step 602. Next, the Dynamic Idle Service 404 sends a request for media content to the Fetch Task 408 at step 604. The Dynamic Idle Service 404 also sends a return message to the GUI 402 at step 606. In response to the Dynamic Idle Service's request for media content, the Fetch Task 408 sends a formatted request for the media content, in an appropriate common format, to the Media GW 410 at step 608. The Media GW 410 then clears a Not-to-Send flag at step 610 and sends a formatted response, including the requested content in the requested format, to the Fetch Task 408 at step 612. After receiving the response, the Fetch Task 408 saves the time of download and associates it with the received media content at step 614. The Fetch Task 408 also parses the received media content, for example, into appropriate channels. The Fetch Task 408 then sends the media content to the Cache Manager 406 for storage in the content cache 306 at step 616. Thereafter, the Cache Manager 406 sends the media content and a notification to the Dynamic Idle Service 404 at step 618 and, in turn, the Dynamic Idle service forwards the media content to the GUI 402 for presentation to the user at step 620.

Figure 7:
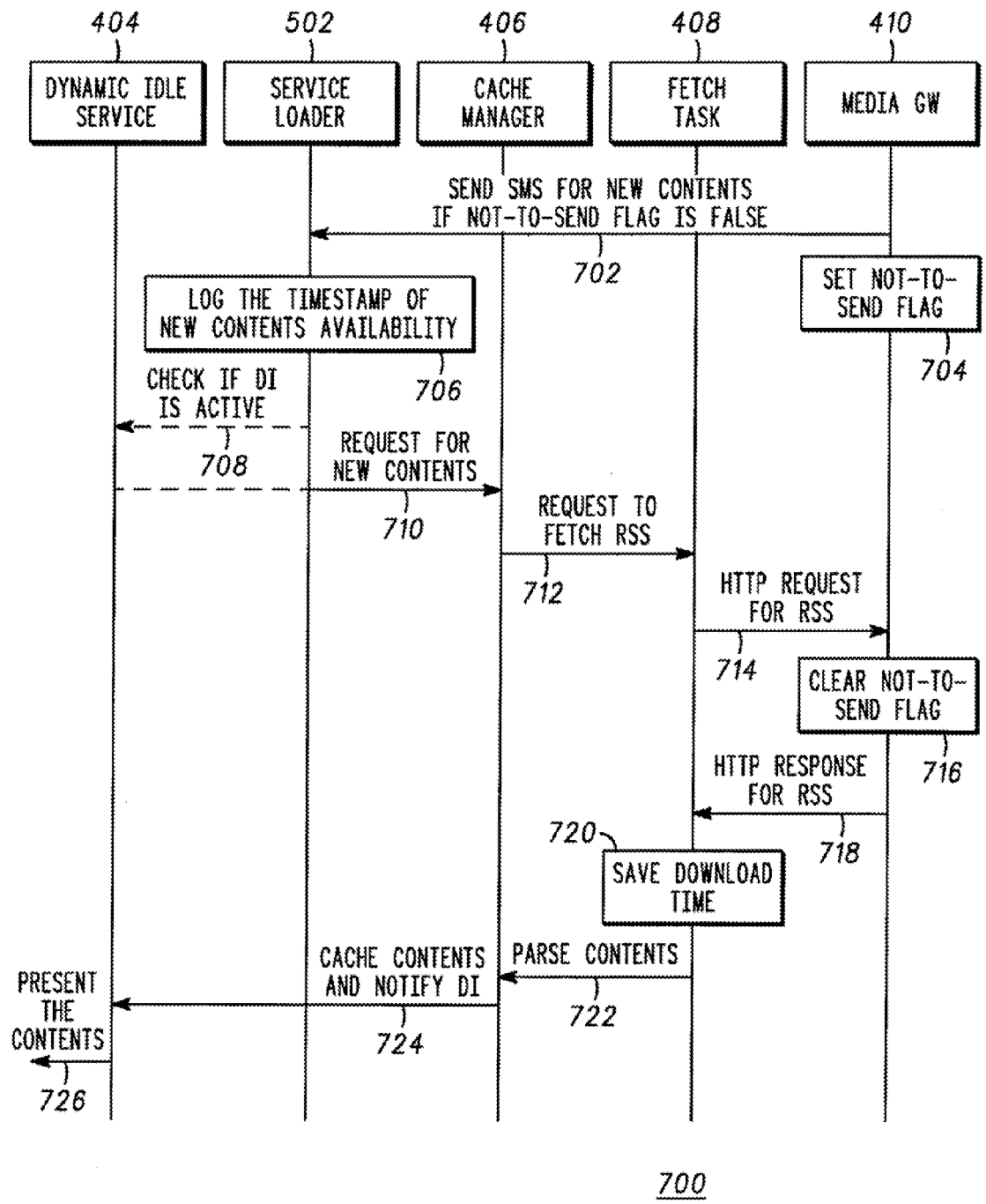
FIG. 7 is a flow diagram illustrating an exemplary new contents notification operation of the device in accordance with the present invention.

FIG. 7 is a flow diagram illustrating an exemplary new contents notification operation 700 of the wireless communication device 104. The media gateway 104 may update the media content of one or more channels as appropriate, such as when new content becomes available or when the user desires to receive new content. For this operation 700, the Media GW 410 determines whether it may send media content to the wireless communication device 104 by checking the Not-to-Send flag. If the Not-to-Send flag indicates that content may be sent, then the Media GW 410 sends a message, such as an SMS, for new contents to the Service Loader 502 at step 702. The Media GW 410 also sets the Not-to-Send flag during or after the message is sent at step 704. Upon receiving the message, the Service Loader 502 logs the timestamp of the new media content availability and associates the timestamp with the new media content at step 706. The Service Loader 502 then check to see if the Dynamic Idle Service 404 is active at step 708. If so, a request for new media content is sent to the Cache Manager 406 at step 710. Next, the Cache Manager 406 sends a request to fetch the new media content to the Fetch Task 408 at step 712 and, in turn, the Fetch Task sends a formatted requested for the new media content, in an appropriate common format, to the Media GW 410 at step 714.

In response, the Media GW 410 clears a Not-to-Send flag at step 716 and sends a formatted response, including the requested content in the requested format, to the Fetch Task 408 at step 718. After receiving the response, the Fetch Task 408 saves the time of download and associates it with the received media content at step 720. The Fetch Task 408 also parses the received media content, for example, into appropriate channels. The Fetch Task 408 then sends the media content to the Cache Manager 406 for storage in the content cache 306 at step 722. Thereafter, the Cache Manager 406 sends the media content and a notification to the Dynamic Idle Service 404 at step 724 and, in turn, the Dynamic Idle service forwards the media content to the GUI 402 for presentation to the user at step 726.

Figure 8:
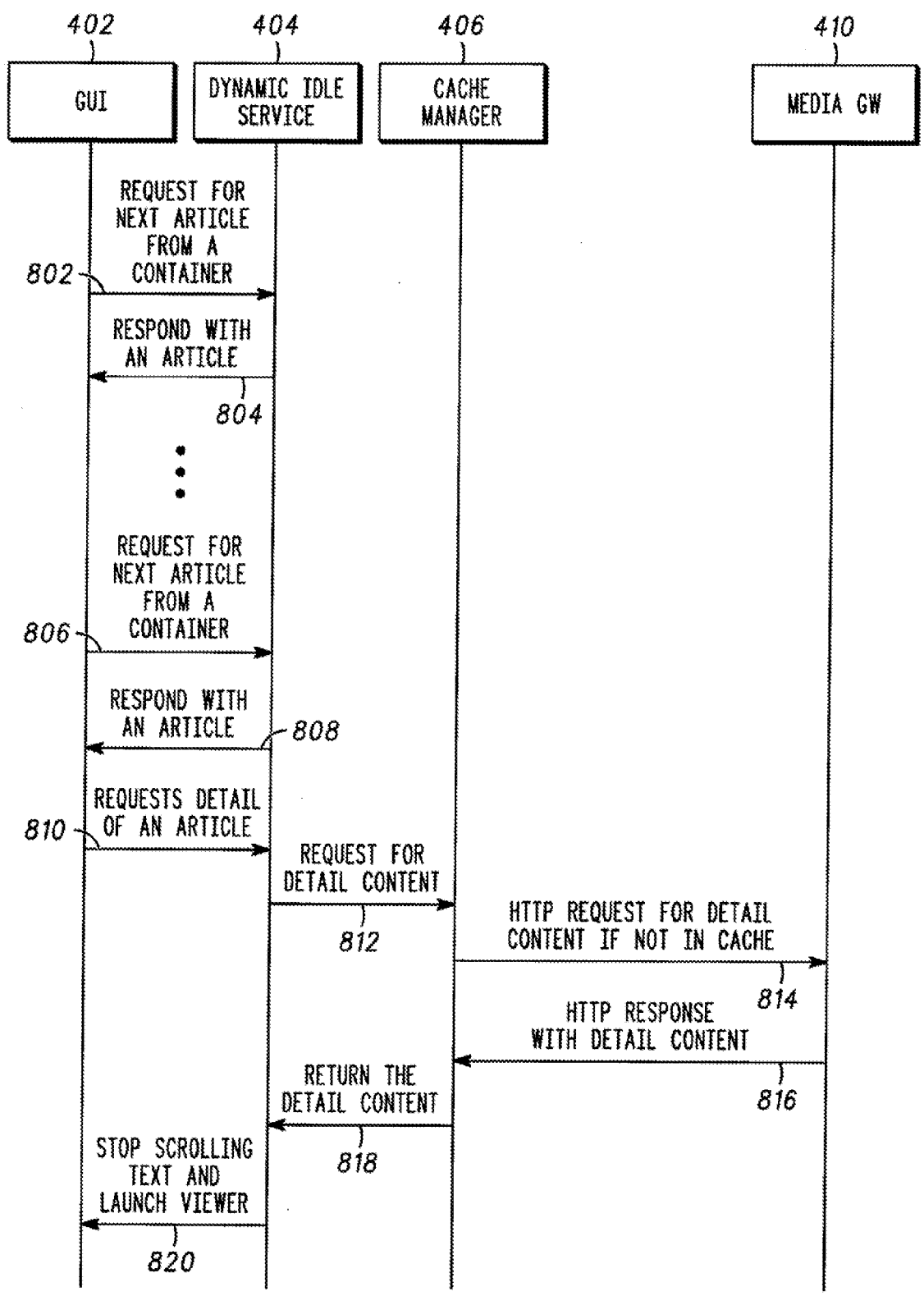
FIG. 8 is a flow diagram illustrating an exemplary display contents operation of the device in accordance with the present invention.

FIG. 8 is a flow diagram illustrating an exemplary display contents operation 800 of the wireless communication device 104. The wireless communication device 104 may scroll or cycle through media content associated with one or more containers to its user. The user may select a particular media content appearing on an output device 208 of the wireless communication device 104 to obtain more detail about the particular media content. For this operation 800, the GUI 402 requests subsequent media content, i.e., the next media content after the media content currently shown on an output device 208, associated with each container from the Dynamic Idle Service 404 at step 802, and the Dynamic Idle Service responds with the requested media content at step 804. This process continues, as represented by steps 806 and 808 until the user selects a particular media content and the GUI 402 sends a request for detail of the particular media content to the Dynamic Idle Service 404 at step 810. The Dynamic Idle Service 404 forwards the request for detail to the Cache Manager 406 at step 812 and, in response, the Cache Manager searches the content cache 306 for the requested detail. If the detail of the particular media content is not in the content cache 306, then the Cache Manager 406 sends a formatted request for the detail to the Media GW 410 at step 814. Next, the Media GW 410 provides a formatted response with the requested detail to the Cache Manager 406 at step 816. The Cache Manager 406 forward the detail to the Dynamic Idle Service 404 at step 818 and, in turn, the Dynamic Idle Service forwards the detail to the GUI 402 at step 820. Upon receiving the detail of the particular media content (or an indication that such detail will be sent), the GUI 402 stops scrolling or cycling the media content and launches an appropriate application for the detail. For example, if the detail is a movie, then the GUI 402 may launch a movie player so that the user may view the detail at an output device 208.

Figure 9:
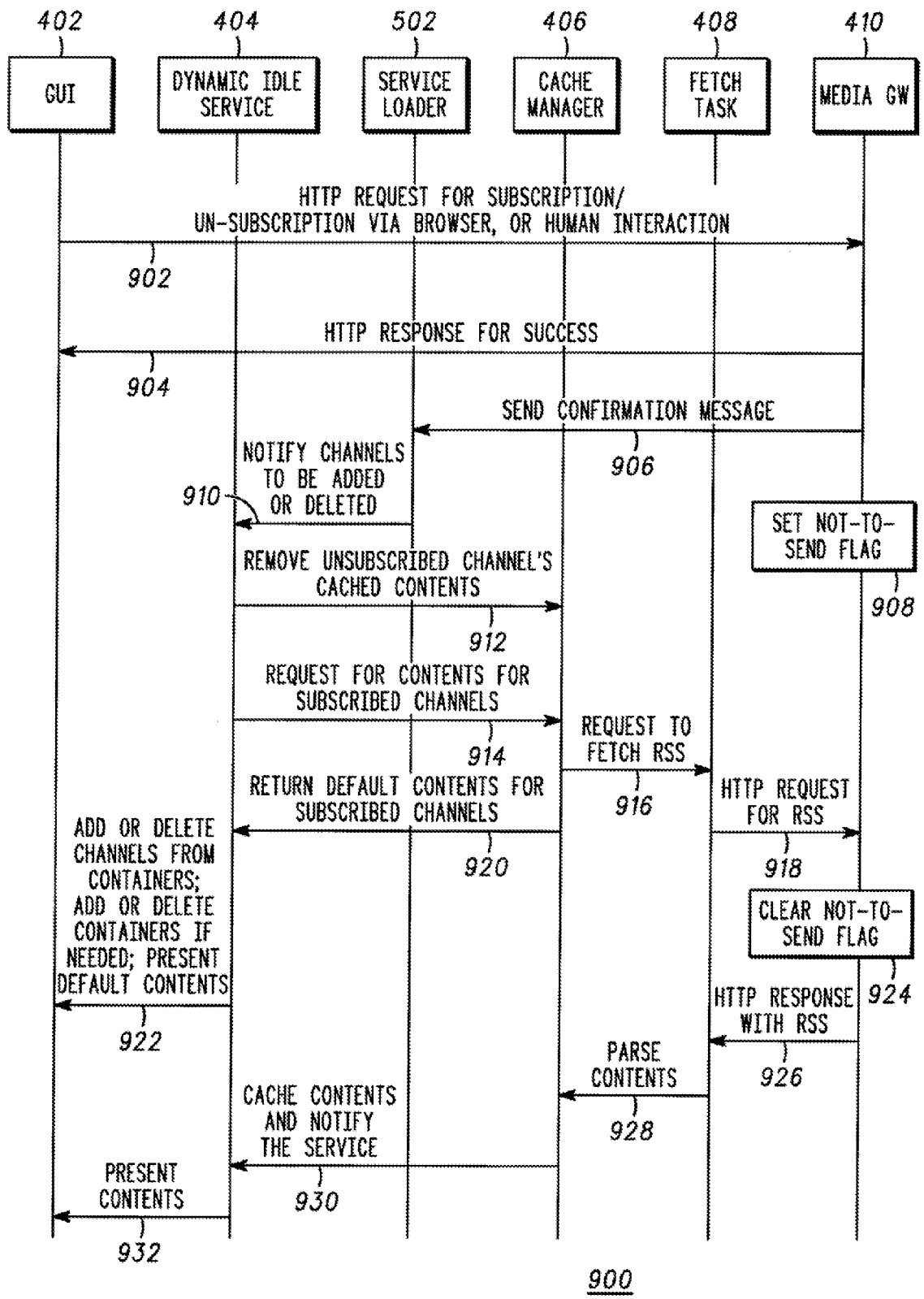
FIG. 9 is a flow diagram illustrating an exemplary channel subscription and un-subscription operation of the device in accordance with the present invention.

FIG. 9 is a flow diagram illustrating an exemplary channel subscription and un-subscription operation 900 of the wireless communication device 104. The user of the wireless communication device 104 may have the ability to pick-and-choose the type of content that may be received by the device. For this operation 900, the GUI 402 sends a request for a subscription or termination of a subscription, i.e., unsubscription, to the Media GW 410 at step 902. The request may be provided by messaging, such as via a browser using HTTP, or by human interaction, such as via voice. In response to the request, the Media GW 410 sends a response to the request to the GUI 402 at step 904. The Media GW 410 also sends a confirmation message to the Service Loader 502 at step 906, and sets the Not-to-Send flag at step 908. The Service Loader 502, in turn, notifies the Dynamic Idle Service 404 of the media content, such as the corresponding channels, that are to be sent or will no longer be sent to the wireless communication device 104 in the future at step 910. The Dynamic Idle Service 404 then instructs the Cache manager 406 to remove cached contents of unsubscribed media content from the content cache 306 at step 912 and to obtain and store content of subscribed media content in the content cache at step 914.

In response to receiving the request for content from the Dynamic Idle Service 404, the Cache Manager 406 sends a request to fetch new media content to the Fetch Task 408 at step 916 and, in turn, the Fetch Task sends a formatted request for the new media content, in an appropriate common format, to the Media GW 410 at step 918. The Cache Manager 406 also provides the existing media content to the Dynamic Idle Service 404 for subscribed media content at step 920. The Dynamic Idle Service 404 then instructs the GUI 402 to add or delete channels from containers, add or delete containers, and/or present default contents to the user as appropriate based on the subscribed and unsubscribed media content at step 922.

In response to receiving the request from the Fetch Task 408, the Media GW 410 clears a Not-to-Send flag at step 924 and sends a formatted response, including the requested content in the requested format, to the Fetch Task 408 at step 926. After receiving the response, the Fetch Task 408 saves the time of download and associates it with the received media content and, also, parses the received media content, for example, into appropriate channels. The Fetch Task 408 then sends the media content to the Cache Manager 406 for storage in the content cache 306 at step 428. Thereafter, the Cache Manager 406 sends the media content and a service notification to the Dynamic Idle Service 404 at step 930 and, in turn, the Dynamic Idle service forwards the media content to the GUI 402 for presentation to the user at step 932.

Figure 10:
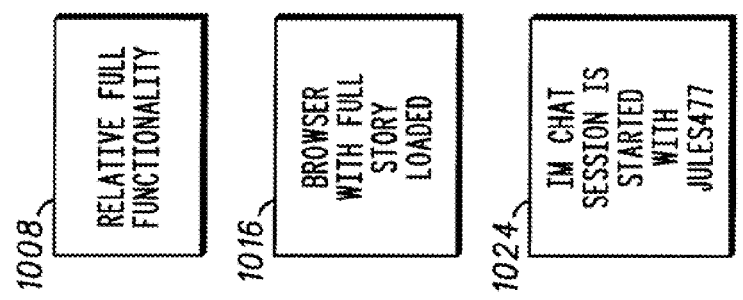
FIG. 10 is a relational diagram illustrating exemplary operations of a device in accordance with the present invention.
Figure 10:
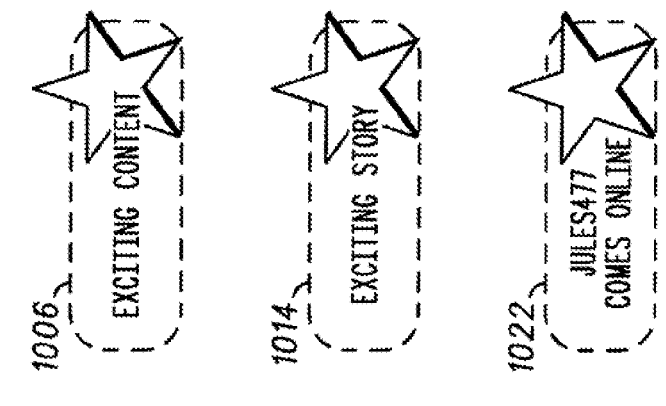
Figure 10:
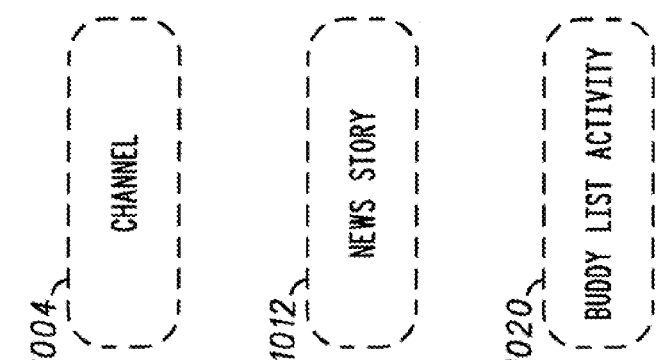
Figure 10:
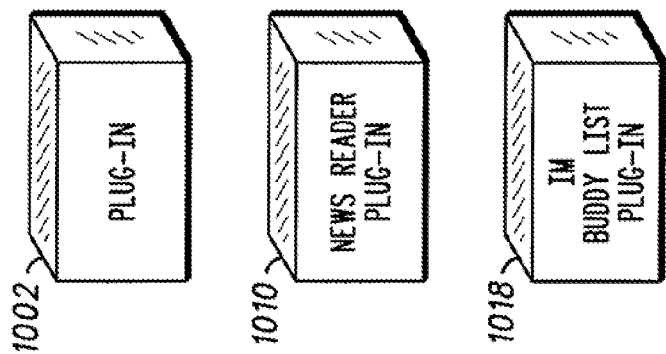

Referring to FIG. 10, there is provided a relational diagram illustrating exemplary operations of a device in accordance with the present invention. The present invention provides a simple way to contextually multitask with applications and features on devices having limited screen sizes and/or limited computing power, such as many types of wireless communication devices. As shown in FIG. 10, the exemplary operations utilizes a framework of containers which display information and provide access to functionality relevant to the information currently displayed. Contextual information is provided and formatted in reusable containers as channels of information or functionality. The information may be delivered by loading functionality into containers, such as plug-ins described above.

The plug-ins may display and gather information in a number of ways, make network connections, gather external information and provide the information via an output device 208. Plug-ins may be loaded into containers to provide customization, particularly for idle state plug-ins. The plug-ins have specific functionality to provide relevant information to an output device 208. The plug-in framework allows the plug-in to launch applications by supplying a launch string. The plug-ins may search locally to the device to gather information and provide the information to the output device 208. The plug-ins may also call the functionality of other applications, services and/or API's on the display and surface the information and/or functionality wherever the container exists. Each piece of information may include a direct access link to more information by providing more content or direct access to functionality, applications or tasks. Examples of plug-ins include news reader plug-ins, short cut plug-ins, and 3rd party plug-ins.

With plug-ins and channels of content, the wireless communication device may passively monitor device activity relating to information provided by one or more output devices 208. Content will be provided to the output device or devices 208 on a regular basis, and deeper content and/or functionality may be accessed by activation of one or more input devices 210.

The general concept of device engagement as well as two examples are shown. For the general concept, a channel may be selected by an input device 210 so that its content may be provided in a container during an idle state of the wireless communication device. Upon selection, as represented by block 1002, a plug-in appropriate for the channel may be associated with the container and gather information, i.e., media content, in the background of the device's operation. Next, as represented by block 1004, the output device 210 provides information through the selected channel. The information may be provided using uncommon technology or common technology such as JAVA SVG, Flash, SMILE and the like. At some point thereafter, as represented by block 1006, a user may select the channel of particular interest by actuating an input device 210 to launch relative functionality. Thus, a command is passed to the processor 204 to cause corresponding functionality to be executed. In response, as represented by block 1008, the user has more access to delve deeper into the content or functionality of the channel.

One type of channel is a media channel which is exemplified by the middle row of FIG. 10. For this example, the media channel utilizes a news reader plug-in. Media channels are pure content, and content creators and owners may deliver content to the device from their current management systems by using a common format to deliver the content, such. A user may choose to display news in a container by utilizing a news reader plug-in as represented by block 1010. Thus, a service 304 may gather formatted feeds, such as XML (RSS) feeds, from the media gateway 102 and store the latest news stories in the content cache 306. The news reader plug-in provides the news stories one at a time through a channel 308 in a container 314, so a user may passively view the news stories, as represented by block 1012. For example, top news stories may be displayed by an output device 208 through an SVG displayer. When an interesting story appears that is of interest to the user, the user may actuate an input device 210 to select the channel and find out more information, as represented by block 1014. The selection of the channel may, for example, cause the news plug-in to obtain the corresponding full story by obtaining an URL of an associated news website from an XML item, as represented by block 1016. The media content may be obtained directly from the website and cached in the content cache 306 or from the content aggregator 108 and cached in the content cache. As a result, a browser may be launched by the processor 204 and the URL of the XML item may be loaded, so that a web page is provided by an output device 208.

Another type of channel is a functional channel which is exemplified by the bottom row of FIG. 10. For this example, the functional channel utilizes an Instant Messaging (IM) buddy list plug-in. Functional channels are single channels with functionality built into them. Examples of functional channels include, but are not limited to, JAVA applications that may be used to gather information from within the device and multimedia players that may fetch rich content from the World Wide Web. A user may desire to monitor IM buddies, an IM buddy list plug-in may be associated with a container, as represented by block 1018. An IM client resident in the wireless communication device may stay up-to-date with the users of the IM buddy list. The user may passively view the activity of her or his buddies at an output device 208 as buddies come online or sign off, as represented by block 1020. When the user desires to communicate with another user who comes online, the user may select the channel using an input device 210, as represented by block 1022. The buddy's identification is passed to the IM client with instructions to initiate a chat session. The IM client initiates the chat session with the device of the other user who just signed on, as represented by block 1024.

Figure 11:
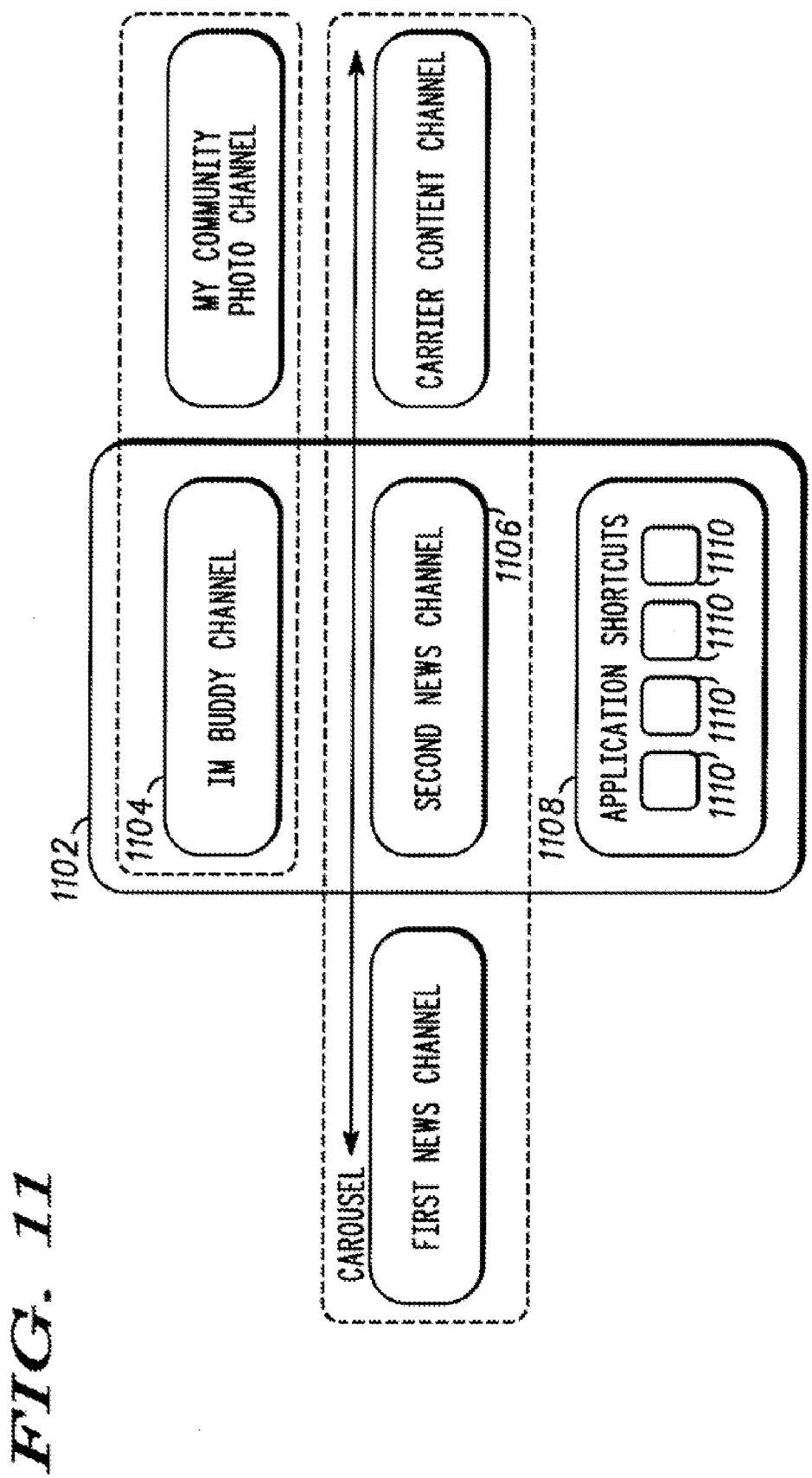
FIG. 11 is a schematic diagram illustrating exemplary navigation of a device in accordance with the present invention.

Referring to FIG. 11, there is provided a schematic diagram illustrating exemplary navigation of a device in accordance with the present invention. A display of a wireless communication device may show and provide interaction for various types of information such as status information regarding the performance of the device and a menu system for operating and configuring the device. The present invention further includes a plurality of display areas for providing channels of content and application shortcuts. In particular, each display area corresponds to a particular container, and each container may provide channel content to its corresponding display area. For one embodiment, as shown in FIG. 11, the display areas have elongated, horizontal dimensions and are provided in parallel and adjacent to each other. However, it is to be understood that the display areas may have other dimensions or positions so long as the functional properties of the display areas are preserved and the content is conveniently viewable by a user.

FIG. 11 shows an illustrative representation of a visual output 216, i.e., display screen 1102, of a wireless communication device. For the example shown, the display screen 1102 includes an upper display area 1104 associated with a first container for providing media content of an IM Buddy channel, a middle display area 1106 associated with a second container for providing media content of a News channel, and a lower display area 1108 associated with a third container for providing application shortcut links 1110. Each container may only display media content associated with one channel at a display area at any given time. The first container utilizes an IM Buddy Activity Viewer plug-in to manage and display each item of the IM Buddy channel to the upper display area 1104 in the appropriate manner, the second container utilizes a News Reader plug-in to manage and display each item of the News channel to the middle display area 1106 in the appropriate manner, and the third container provides shortcut links 1110 to a plurality of applications at the lower display area 1108. For the third container, each shortcut link 1110 may be associated with a plug-in or other application stored in memory 206 of the device such as, but not limited to, an access plug-in to an online service, a phonebook application, a file management application, a calendar application and a multimedia management plug-in.

A user may navigate among the display areas 1104, 1106, 1108 to select one or more channels for each container and its associated display area. After a particular channel is selected, the processor 204 automatically loads the appropriate plug-in or plug-ins 312 and display template 316 for the channel based on channel configuration information and format information fetched by the device's service 304. The user may also navigate between items within a container, such as various locations and shortcut links within a display area.

As represented by FIG. 11, a carousel function of the wireless communication device allows multiple channels to be displayed in a single container. As stated above, each container may only display media content associated with one channel at a display area at any given time. Thus, the carousel function cycles through all channels associated with a particular container, and its associated display area, so that the channels may be viewed by a user within a given time period, i.e., a one-cycle period. For example, the first display area 1104 may cycle through an IM Buddy channel and a My Community Photo channel. Likewise, for example, the second display area 1106 may cycle through a First News channel, a Second News channel and a Carrier Content channel. Although the carousel function may cycle to another channel in response to user activation of an input device 210, the carousel function preferably cycles from one channel to another automatically without user input. The carousel function may change the channel of each container at regular predetermined time intervals or the carousel function may determine a viewing time period for each channel based on its channel type or media content type. Although channel cycling may occur at predetermined time intervals or based on an initial time set by a user, the wireless communication device may also coordinate the cycling of channels for each container to maximize viewing ease by the user. For example, the channels may change for each display area in sequential order from top-to-bottom (i.e., display area 1104 to display area 1106 to display area 1108), or vice-versa, so that the user may view each display area in the same sequential order. The carousel function may further cycle through shortcut links and channels of shortcut links in the same manner. For example, the third display area 1108 may cycle between a first group of shortcut links 1110 to a second group of shortcut links or cycle to other groups of shortcut links before returning the first group.

Figure 12:
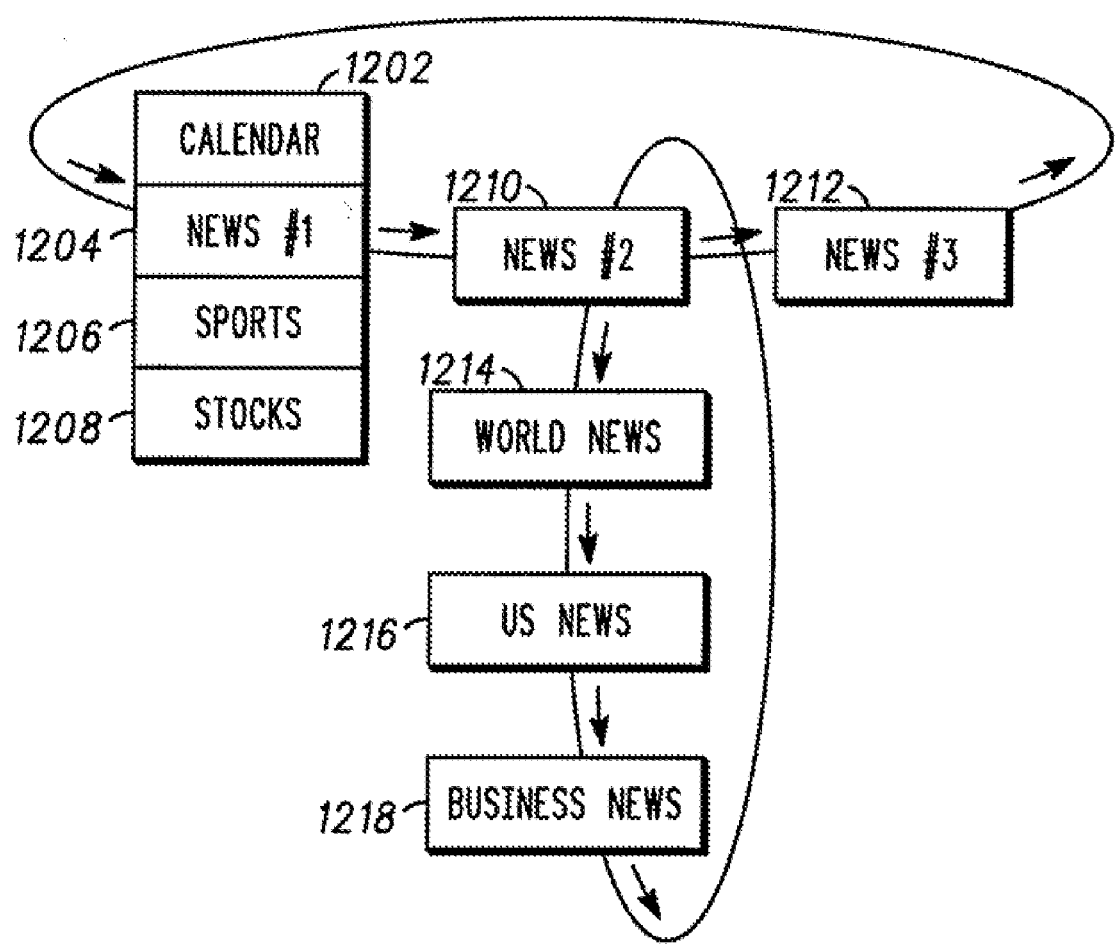
FIG. 12 is a schematic diagram illustrating another embodiment of exemplary navigation of a device in accordance with the present invention.

Referring to FIG. 12, there is provided a schematic diagram illustrating another embodiment of exemplary navigation of a device. For this embodiment, the wireless communication device utilizes a navigation structure 1200 as well as prioritization of media content relative to each other. The presentation of the media content may be controlled by their priority or context, thus allowing for automatic arrangement of displayed media content based on various factors. In other words, some media content may have an associative or hierarchical relationship with other media content.

For this embodiment, the display of the wireless communication device may show a plurality of display areas and each display area corresponds to a container for showing a particular channel. For example, as shown in FIG. 12, a first display area shows a Calendar channel 1202, a second display area shows a News #1 channel 1204, a third display area shows a Sports channel 1206 and a fourth display area shows a Stocks channel 1208. The items of each channel may cycle horizontally or vertically within their respective display area.

A user may select a channel for any container so, in reference to FIG. 12 for example, the user may select between a channel for a News #1 channel 1204, another channel for a News #2 channel 1210 and yet another channel for a News #3 channel depending upon the news source desired by the user. Thereafter, the carousel function of the wireless communication device may cycle through the items for the selected channel. For example, the carousel function may cycle through headlines of News #2 1210, News #2 World News 1214, News #2 U.S. News 1216 and News #2 Business News 1218 if the user selects the News #2 channel.

In lieu of a user selection of a channel for a particular container, the wireless communication device may also configure the containers to present media content based other triggering factors, such as time and location. Triggering factors may be hardware based (as well as software based) and include, but are not limited to, opening the wireless communication device, unlocking the device, moving the device to actuate a motion, moving the device to actuate a location positioning system, and operating the device. Information relating to the current time of the device may be received from the timing circuit 211. The timing circuit 211 may be integrated within the processor 204 or may be a separate component coupled to another component of the internal components 200. Examples of the timing circuit 211 include, but are not limited to, an internal clock, a receiving circuit that receives clock information via the transceiver 202 and/or component interface 212, and any other type of circuit that may determine a current time based on information received from another component of the internal components 200.

For one embodiment, the wireless communication device may select a particular channel among a plurality of channels associated with a container of the device based on the current time of the device. A unit of content of the particular channel may be provided by the dynamic container if an update time of the particular channel corresponds to the current time of the device. The update time may correspond to a time period when content of the particular channel is recurringly updated. For example, for a device located in the United States, the device may select a European channel for a particular container around noon every weekday since the European evening news would become available at about that time on those days. The device may collect information about the availability of the European evening news by monitoring the media content received for a particular channel during a predetermined time period, such as the previous week, and storing the information in the memory 206. The processor 204 may thereafter analyze the stored information to determine the appropriate update time. In the alternative, the user may provide the update time via an input device 210. Accordingly, the transceiver 202 may obtain the media content, e.g., the European evening news, before the update time of the particular channel so that the information will be ready for viewing by the user with minimal delay.

For another embodiment, the wireless communication device may select a particular channel among a plurality of channels associated with a container of the device based on the current location of the device. Information relating to the current location of the device may be received from the location circuit 228. The location circuit 228 may be integrated within, or separate from, another component of the internal components 200. Examples of the location circuit 228 include, but are not limited to, a Global Positioning System circuit that receives location information via the transceiver 202 and/or component interface 212, and any other type of circuit that may determine a current location based on information received from another component of the internal components 200.

For this embodiment, a unit of content of the particular channel may be provided by the dynamic container if an associated location of the particular channel corresponds to the current time of the device. The associated location may correspond to a location of a source associated with the particular channel, such as a European broadcast station for the European evening news. The location of the source may be provided to the device via channel settings received from the media gateway 102 by the device's server 304. Knowing the location of the source, if a user travels with the device to a European location, then the device may select a European channel for a particular container. Thereafter, the transceiver 202 may obtain the media content, e.g., the European evening news, as soon as possible so that the information will be ready for viewing by the user with minimal delay.

Figure 13:
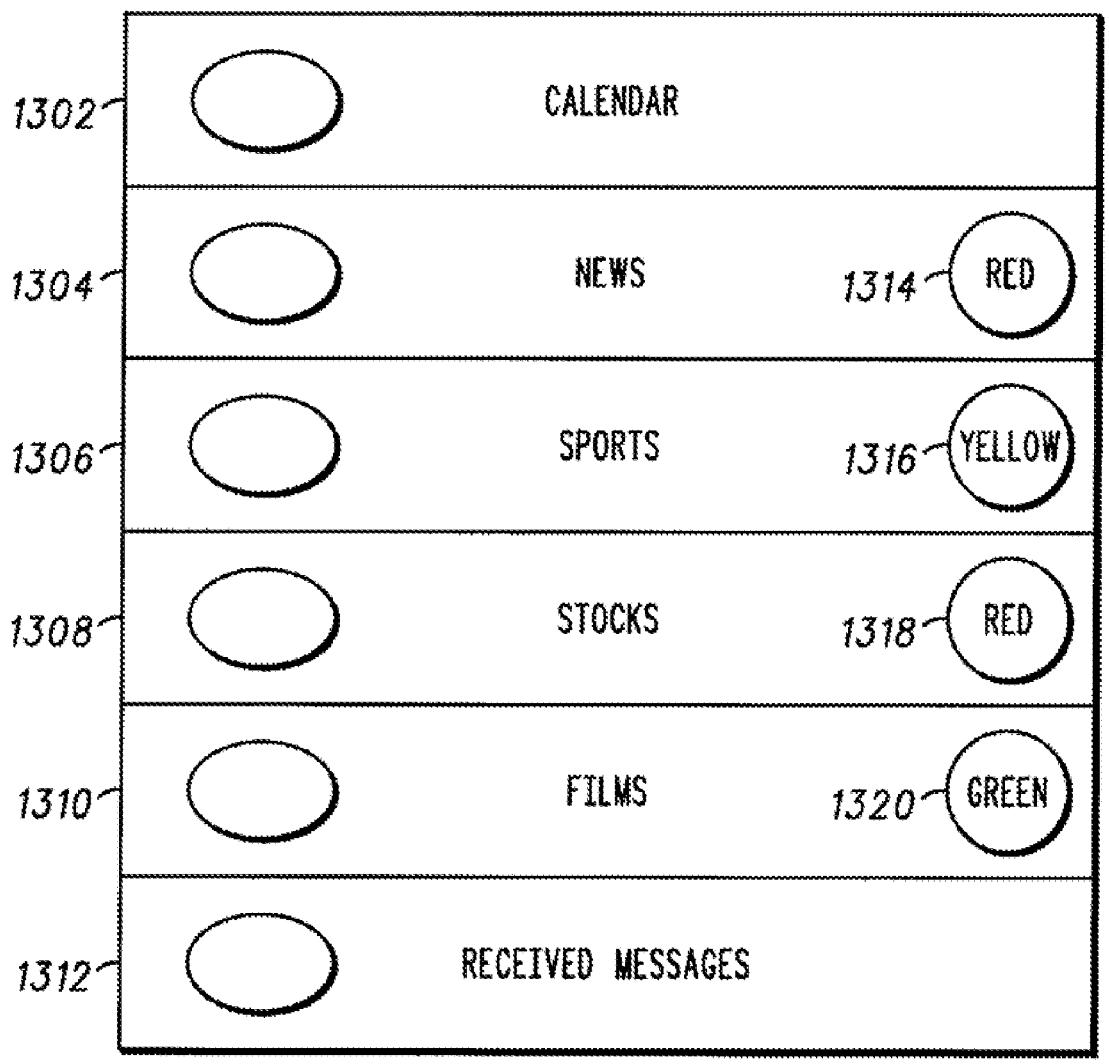
FIG. 13 is a screen view illustrating an embodiment of an exemplary image shown by a device in accordance with the present invention.

Referring to FIG. 13, there is provided a screen view illustrating an embodiment of an exemplary image shown by a device. For this embodiment, multiple display areas 1300 are shown as part or all of an output device 208 of a wireless communication device. Each display area corresponds to a container and one or more channels or applications are managed by the container. For this example, a first container provides media content relating to a Calendar application at a first display area 1302, a second container provides media content relating to a News channel at a second display area 1304, a third container provides media content relating to a Sports channel at a third display area 1306, a fourth container provides media content relating to a Stocks channel at a fourth display area 1308, a fifth container provides media content relating to a Films channel at a fifth display area 1310, and a sixth container provides media content relating to a Received Messages application at a sixth display area 1312.

For the containers that are associated with at least one channel, the corresponding display areas 1304, 1306, 1308, 1310 may show an identifier, such as a color code, style, shading pattern, or other visual indicator, to conveniently indicate the age of the media content presented by the container. For another embodiment, the identifier may also be mapped to the type of the media content in addition to the age of the media content. The map may be selected by the user or included in the media content when downloaded from the media gateway 102. If selected by the user, the user can manually set, using a configuration page, indication mapping instructions of a rating criteria for interpreting age information. Examples of types of media content include, but are not limited to, news, sports, stocks and films.

The type of the media content may be used to identify a reference time frame for interpreting the age of the media content. For example, media content relating to news generally becomes dated in a matter of hours, whereas film listings are typically valid for an entire week. As shown in FIG. 13, for example, the user may manually set the identifiers 1314, 1318 for the News and Stocks to go from high rating indicator, such as a green icon, to a medium rating indicator, such as a yellow icon, after a half hour has passed without an update. If more time passes without an update, the identifiers 1314, 1318 for News and Stocks may turn to a low rating indicator, such as a red icon. Turning to an example for the Sports channel, the latest media content downloaded for the Sports channel has set the identifier 1316 for a dynamic indication for the a sporting event. In particular, the identifier may indicate the probability that the current score will be the final score for the sporting event. Thus, for example, the identifier 1316 for Sport channel may show a medium rating indicator when the sporting event is about half over and a low rating indicator when the game is close to ending. For the example shown, halftime is occurring for an American football game, so the identifier shows a medium rating indicator, such as a yellow icon. Finally, the information downloaded for the Film container is set automatically to expire at Thursday at midnight, since the schedule at theaters is fixed weekly at that time. Thus, assuming that the current time is a date earlier in the week, the identifier 1320 for the Film channel is set to a high rating indicator, such as a green icon. It is to be understood that any kind of indicator or gauge may be used instead of the color code used by the above example.

Figure 14:
FIG. 14 is a conceptual view illustrating exemplary communications and resulting actions of another embodiment in accordance with the present invention.
Figure 14:
Figure 14:
Figure 14:
Figure 14:
Figure 14:

Referring to FIG. 14, there is provided a conceptual view illustrating exemplary communications and resulting actions of another embodiment. This embodiment tracks viewing and usage habits of the wireless communication device based on time and activity. The device may deliver information and experiences that are integrated with their habitual behaviors. By informing the device of these results, the device is capable of limiting its fetching operations to relevant and useful information at times when there is high probability of the information being consumed. For one embodiment, the above operations may be performed by the media gateway 102 and, for another embodiment, they may be performed by the wireless communication device 104.

The media gateway 102 comprises a transceiver and a processor coupled to the transceiver. The media gateway 102 identifies one or more events occurring at the wireless communication device during a predetermined time period. In particular, the transceiver 202 may receive usage information from the wireless communication device 104 that indicates activity of the device during the predetermined time period. The media gateway 102 determines a reporting event based on the one or more events and a reporting time corresponding to the reporting event. In particular, the processor 204 may determines a reporting time based on the usage activity of the device during the predetermined time period, so that the transceiver 202 may communicate event content to the device at a reporting time. Stated another way, the processor 204 may determine a time period of inactivity based on the usage information of the device, so that the transceiver 202 may minimize communication of event content to the device during at least one future time period corresponding to the time period of inactivity. One way to determine the reporting time is to identify a particular time of day when activity occurs and marking the particular time of day for future days. Another way to determine the reporting time is to identify time periods when the device is not being used, and minimizing communication to the device during those time periods. The event content corresponding to the reporting event is obtained before the reporting time to minimizing any delay in providing the content to the user.

As shown in FIG. 14, the present invention makes intelligent decisions about communications between the media gateway 102 and the wireless communication device 104 by transmitting media content from the media gateway to the device just before the user is likely to consume the media content. For example, on an average weekday, a user may be asleep until 7:00 AM and reads the weather report for the day some time after waking-up. Thus, based on this information, the media gateway 102 knows to send an up-to-date weather report to the device 104 about ten minutes before the user typically wakes-up, i.e., 6:50 AM, as represented by block 1402. Thereafter, the user may wake-up at 7:00 AM and check the received weather report before getting dressed, as represented by block 1404. While checking the weather report, the device 104 also noticed that the user read a news story about a new health drink and reports this activity to the media gateway 102. The media gateway 102 records this activity in the memory 206, including the time when the activity occurred, for future reference. For example, the media gateway 102 may obtain media content, e.g., news, advertisements, and the like, about health drinks before the user wakes-up the next day so that the user may read more up-to-date information this subject matter.

Continuing this example, the user reads news headlines from the wireless communication device 104 at 7:40 AM, as represented by block 1406. The media gateway 102 already obtained the news content in advance, e.g., 7:30 AM, because the media gateway determined that 7:40 AM is a regular reporting time for the device based on prior activity monitored by the device. For example, the prior activity may be access to news headlines every day the previous week at about 7:45 AM. The user then drives to work and is busy for the entire morning, as represented by block 1408. The media gateway 102 previously noted from information received from the device 104 that, during the previous week, the device was only used to receive calls between 8:30 AM and 12:00 noon. Accordingly, the media gateway 102 minimized communication of media content to the device 104 during this time period, e.g., content was only communicated once. At noon, the user reads news stories during lunch, as represented by block 1410. The media gateway 102 knows that the user typically reads news stories soon after 12:00 noon based on information received from the device 104, so the media gateway downloaded media content to the content cache 306 ten minutes earlier, i.e., 11:50 AM. Finally, for this example, the device 104 notices that the user read a promotional advertisement about a new health drink and accessed a web site about health drinks at about 12:07 PM, as represented by block 1412. The device 104 reported this activity to the media gateway 102 so, based on this past activity, the media gateway may deliver up-to-date health news at 11:50 AM the next day.

As stated above, the above activity may be performed by the wireless communication device 104 instead of the media gateway 102. The wireless communication device 104 comprises a user interface (comprising the input devices 210), a processor 204 coupled to the user interface, and a transceiver 202 coupled to the processor. The processor 204 monitors usage information indicating activity of the user interface during a predetermined time period. The processor 204 also determines a reporting time based on the usage information of the user interface and/or a time period of inactivity based on the usage information of the wireless communication device. The transceiver 202 requests the media gateway 102 to communicate event content at the reporting time and/or minimize communication of event content during at least one future time period corresponding to the time period of inactivity. The operation of the media gateway 102 and the wireless communication device 104 for this embodiment and similar to their operation for the previous embodiment, except that the activity tracking is performed by the device and the media gateway merely reacts to requests for content from the device.

Figure 15:
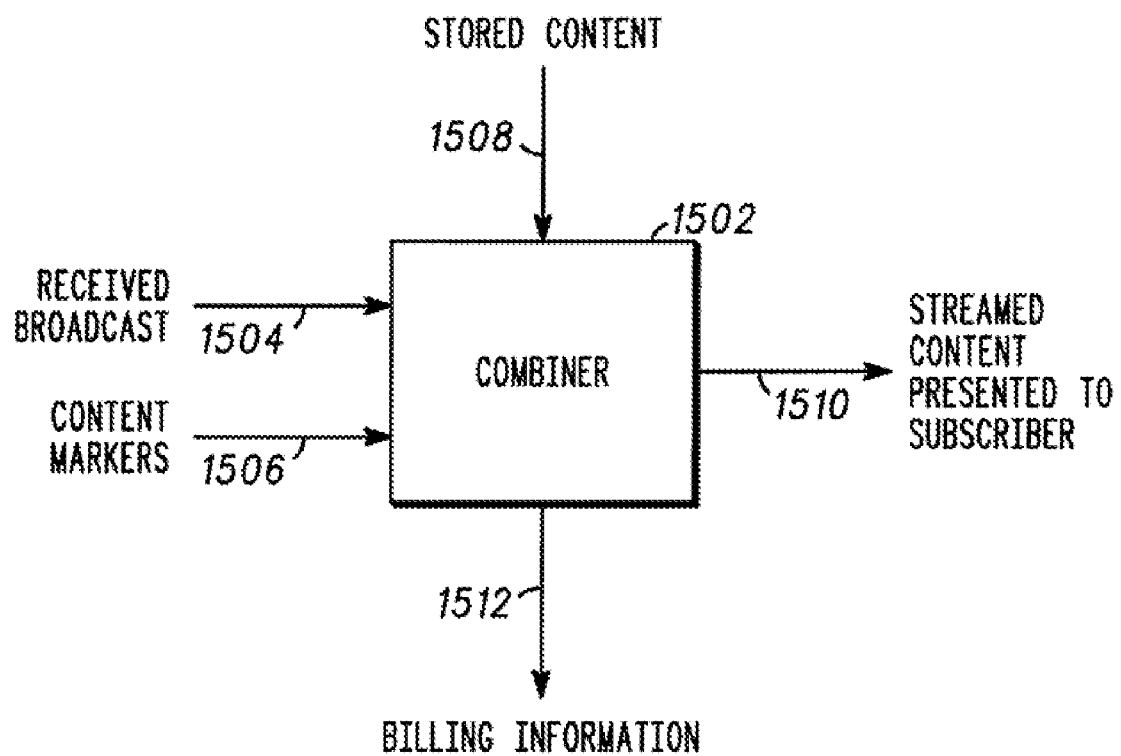
FIG. 15 is a block diagram illustrating an embodiment of a combining function in accordance with the present invention.

Referring to FIG. 15, there is provided a block diagram illustrating an embodiment of a combining function. This embodiment provides seamless streams of information to the user that comprise receive broadcast information received from a remote location with other information stored locally. Locally stored information may include, for example, advertisements or other targeted or user-specific information, such as traffic information and announcements, which have been previously downloaded to the wireless communication device 104. For example, a company may wish to introduce, i.e., insert, an advertisement into a generic stream received by the wireless communication device over a broadcast channel. A combiner 1502 within the device may be used to insert the advertisement into the generic stream. Signaling in the received broadcast stream may indicate the location and/or length of the message to be inserted, and the device may manage these stored messages in a database.

The wireless communication device 104 receives a first media content or broadcast content 1504 and a first media data or markers 1506 associated with the first media content from a remote server, such as the media gateway 102. The first media data 1506 indicates one or more insertion points of the first media content 1504 where other information may be inserted. The first media content 1504 and the first media data 1506 may be received simultaneously or separately. If the first media data 1506 is received before the first media content 1504, then a second media content or stored content 1508 may be retrieved from the local memory 206 irrespective of whether the first media content has been received. The first media data 1506 may also indicate the length of information that may be inserted at each insertion point.

The device 104 then receives the second media content 1508 from its memory 206. The second media content 1508 may have been previously received from the remote server, such as the media gateway 102, or another source, such as the content aggregators 108 and the media providers 112. Also, the user may, via an input device 210, select a particular portion of the second media content 1508 from multiple portions of the second media content for insertion into the first media content 1504. In addition, the processor 204 may identify portions of the second media content 1508 having an appropriate length for insertion into the first media content 1504. Thereafter, the device 104 provides a combined media 1510 to an output device 208, such as a visual output device 216, an audio output device 218 or a combination thereof The combined media 1510 includes the first media content 1504 and the second media content 1508, or a part thereof, inserted at one or more insertion points of the first media content.

Optionally, the device 104 may communicate billing information 1512 to a remote billing center in response to providing the combined media 1510 to the output device 208. When the second media content 1508 is provided to the user of the device 104, and acknowledged by the combiner 1502, the billing information 1512 may be created and sent to the billing center. The billing information 1512 would indicate that the second media content 1508 was actually consumed by the user. An appropriate billing invoice for the service of providing the advertisement to the user may then be provided to the source of the advertisement.

Figure 16:
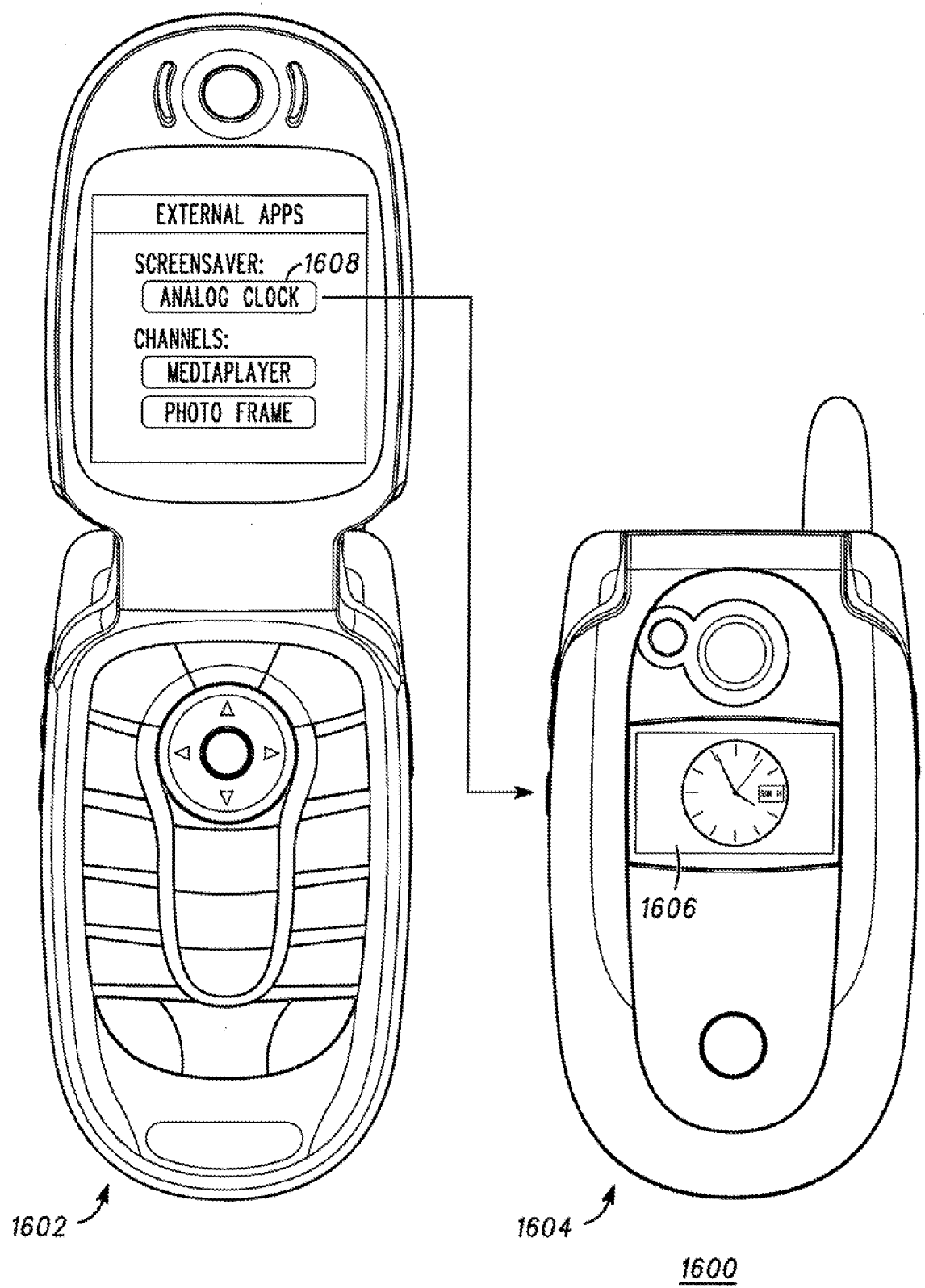
FIG. 16 is a front planar view of a wireless communication device in an open position showing a first display and a closed position showing a second display.

Referring to FIG. 16, there is provided a wireless communication device 1600 in an opened position 1602 and a closed position 1604. The wireless communication device 1600 provides media content of a channel to an external display 1606. The device 1600 has a clamshell form factor and comprises a housing having two displays. One display, i.e., an internal display 1608, is located on the inside of the device 104. Thus, the internal display 1608 is exposed when the device is opened and covered when the device is closed. The other display, i.e., an external display 1606, is located on the outside of the device 104. Thus, the external display 1606 is exposed regardless of whether the device is opened or closed.

The wireless communication device 1600 further comprises a memory 206 that stores multiple applications and/or multiple media content that may be shown by the external display 1606, and a processor 204 coupled to the external display. The processor changes operation of the external display 1606 from one application to another and/or from one media content to another. Similar to previous embodiments, a container is associated with the visible area of the external display 1606 and may be associated with one or more plug-ins and one or more channels of media content. Also, the container for the external display 1606 may only display one channel at any given time. Accordingly, the processor 204 is capable of cycling through a group of applications and/or media content in a particular order and causes the external display 1606 to change in accordance with the predetermined order.

For one embodiment, the wireless communication device 1600 may further comprise one or more sensors, e.g., input devices 210, supported by the housing and coupled to the processor 204. The processor 204 is capable of changing operation of the external display 1606 in response to an activation of a sensor. For another embodiment, the device 1600 may further comprise two sensors, i.e., input devices 210, supported by the housing and coupled to the processor 204.

One sensor may cause the processor 204 to cycle through multiple applications of a particular channel one-by-one in a particular order, and the other sensor may cause the processor to cycle through the applications of the particular channel one-by-one in an order opposite the particular order. For yet another embodiment, the processor 204 executes automatically an application when operation of the external display 1606 is changed to the application and/or terminates automatically an application when operation of the external display is changed from the application. For still another embodiment, the device 1600 further comprises a user interface supported by the housing and coupled to the processor 204. The processor 204 changes operation of the external display 1606 to a default application when a predetermined time period of inactivity at the user interface is detected.

A user of the wireless communication device 1600 may manage media content, channels and applications through a control panel application in the first display, i.e., the internal display 1608. For example, the control patent may set a screensaver (as part of a channel or otherwise), timeout settings, select accessible channels and preferred channels, configure display order of channels and/or items of a channel, loading/unloading channels into the content cache 306 of the device, and configure other channel-specific settings.

Figure 17:
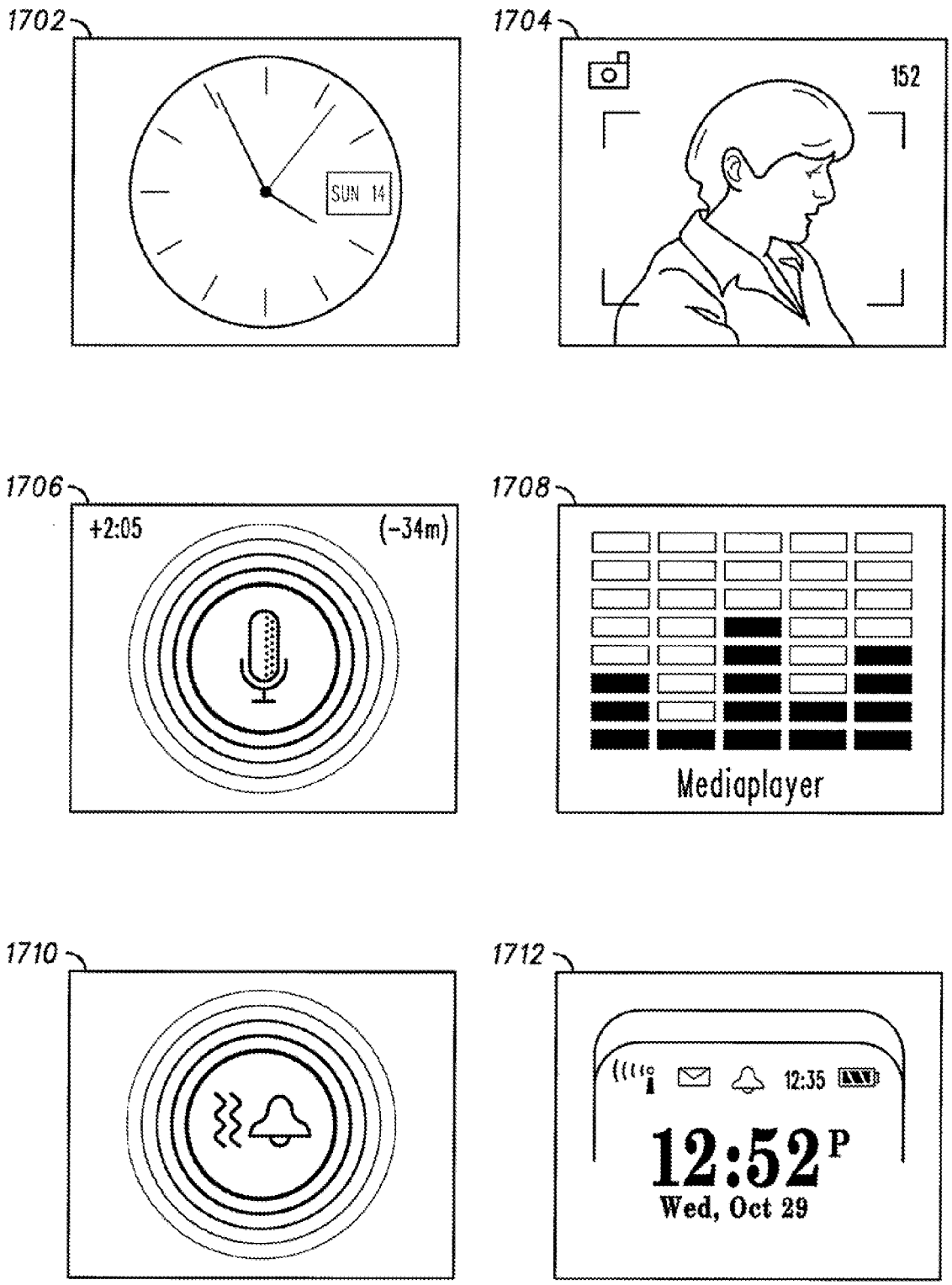
FIG. 17 is a planar view of exemplary images that may be shown by a second display of a wireless communication device.

Referring to FIG. 17, the carousel function of the wireless communication device, describe above, allows multiple channels and/or applications to displayed in a single container, and each container may only display one channel or application at a display area at any given time. Thus, the carousel function cycles through all channels and/or applications associated with the container, and its associated display area of the external display, so that the channels may be viewed by a user within a given time period. For example, as shown in FIG. 17, the external display may cycle through applications and/or media content include, but not limited to, a clock channel or application 1702, a photo channel or application 1704, a microphone channel or application 1706, a multimedia player channel or application 1708, an alarm channel or application 1710, and a status channel or application 1712. The status channel or application may include a variety of information including, but not limited to, time information (including date and time) and an image or logo.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device for providing channel information comprising:
   a housing having a first display and a second display, the housing having a first position exposing the first and second displays and a second position covering the first display and exposing the second display;
   a memory configured to store a plurality of media objects that may be shown by the second display; and
   a processor, coupled to the second display, configured to change operation of the second display from one media object to another;
   a first sensor, supported by the housing and coupled to the processor, configured to cause the processor to cycle through the plurality of applications one-by-one in a particular order; and
   a second sensor, supported by the housing and coupled to the processor, configured to cause the processor to cycle through the plurality of applications one-by-one in an order opposite the particular order.

2. The wireless communication device of claim 1, further comprising a select key, coupled to the processor, configured to interact with a media object currently shown by the second display.

3. The wireless communication device of claim 1, wherein the processor executes automatically a particular application when operation of the second display is changed to the particular application.

4. The wireless communication device of claim 1, wherein the processor terminates automatically a particular application when operation of the second display is changed from the particular application.

5. The wireless communication device of claim 1, further comprising a user interface supported by the housing and coupled to the processor, wherein the processor changes operation of the second display to a default application when a predetermined time period of inactivity at the user interface is detected.

6. The wireless communication device of claim 1, wherein the first display is configured to operate at least one configuration setting that controls operation of the second display.

* * * * *